United States Patent
Demura et al.

(10) Patent No.: US 7,856,815 B2
(45) Date of Patent: Dec. 28, 2010

(54) EXHAUST PURIFICATION SYSTEM FOR INTERNAL COMBUSTION ENGINE

(75) Inventors: Takayuki Demura, Mishima (JP); Shigeki Miyashita, Susono (JP); Isamu Nakada, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 534 days.

(21) Appl. No.: 11/996,351

(22) PCT Filed: Jul. 27, 2006

(86) PCT No.: PCT/IB2006/002046

§ 371 (c)(1),
(2), (4) Date: Jan. 22, 2008

(87) PCT Pub. No.: WO2007/012952

PCT Pub. Date: Feb. 1, 2007

(65) Prior Publication Data

US 2008/0209900 A1    Sep. 4, 2008

(30) Foreign Application Priority Data

Jul. 29, 2005  (JP)  ............... 2005-221489
Jul. 29, 2005  (JP)  ............... 2005-221490

(51) Int. Cl.
*F01N 1/00* (2006.01)
(52) U.S. Cl. ............... 60/324; 60/285; 60/288; 60/292; 60/305
(58) Field of Classification Search ............ 60/285, 60/287, 288, 292, 301, 305, 323, 324
See application file for complete search history.

(56) References Cited

U.S. PATENT DOCUMENTS

| 4,926,634 | A | * | 5/1990 | Putz et al. | 60/274 |
| 5,384,098 | A | * | 1/1995 | Morikawa | 422/111 |
| 5,956,949 | A | * | 9/1999 | Mayer et al. | 60/301 |
| 6,182,446 | B1 | * | 2/2001 | Gunther et al. | 60/278 |
| 6,928,988 | B2 | * | 8/2005 | Nishigaki | 123/481 |
| 7,497,074 | B2 | * | 3/2009 | Surnilla et al. | 60/285 |

FOREIGN PATENT DOCUMENTS

| JP | 03 281929 | 12/1991 |
| JP | 6-159045 | 6/1994 |
| JP | 6-221229 | 8/1994 |
| JP | 2002-155784 | 5/2002 |
| JP | 2002 364352 | 12/2002 |
| JP | 2003-138960 | 5/2003 |
| JP | 2003 343244 | 12/2003 |
| JP | 2004 245061 | 9/2004 |

* cited by examiner

*Primary Examiner*—Binh Q. Tran
(74) *Attorney, Agent, or Firm*—Oblon, Spivak, McClelland, Maier & Neustadt, L.L.P.

(57) ABSTRACT

In an exhaust purification system that purifies exhaust from a plurality of cylinder groups of an internal combustion engine, an exhaust passageway (1,51) from each cylinder group is divided into a plurality of passageways (2a, 2b, 52a, 52b/3, 53). With regard to one or more of the divided exhaust passageways (3,53), the amount of exhaust passing therethrough is reduced so as to reduce the heat release to the outside from the exhaust as a whole. In this manner, the temperature of exhaust introduced into an exhaust purification device (4,54) is kept at high temperature.

17 Claims, 10 Drawing Sheets

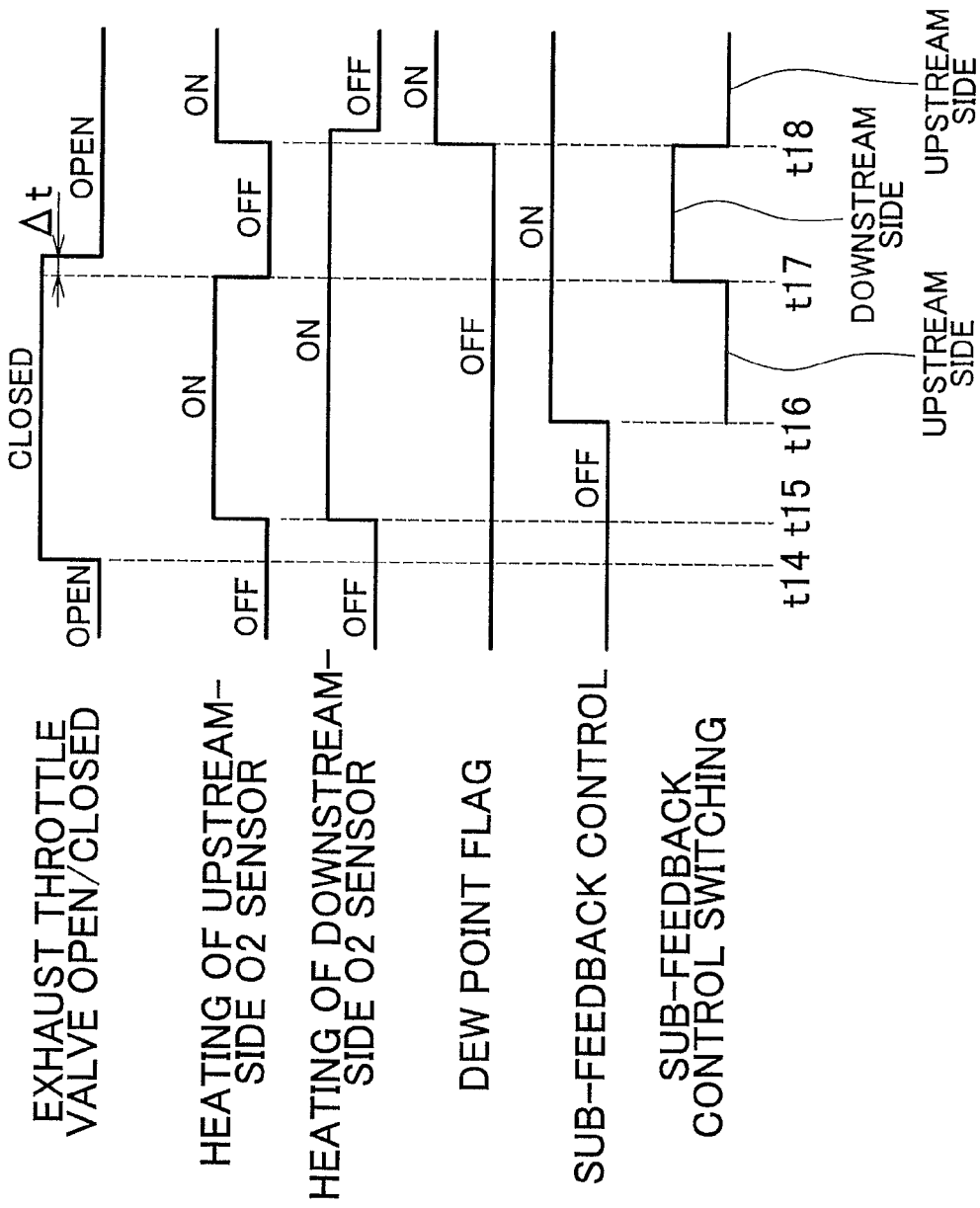

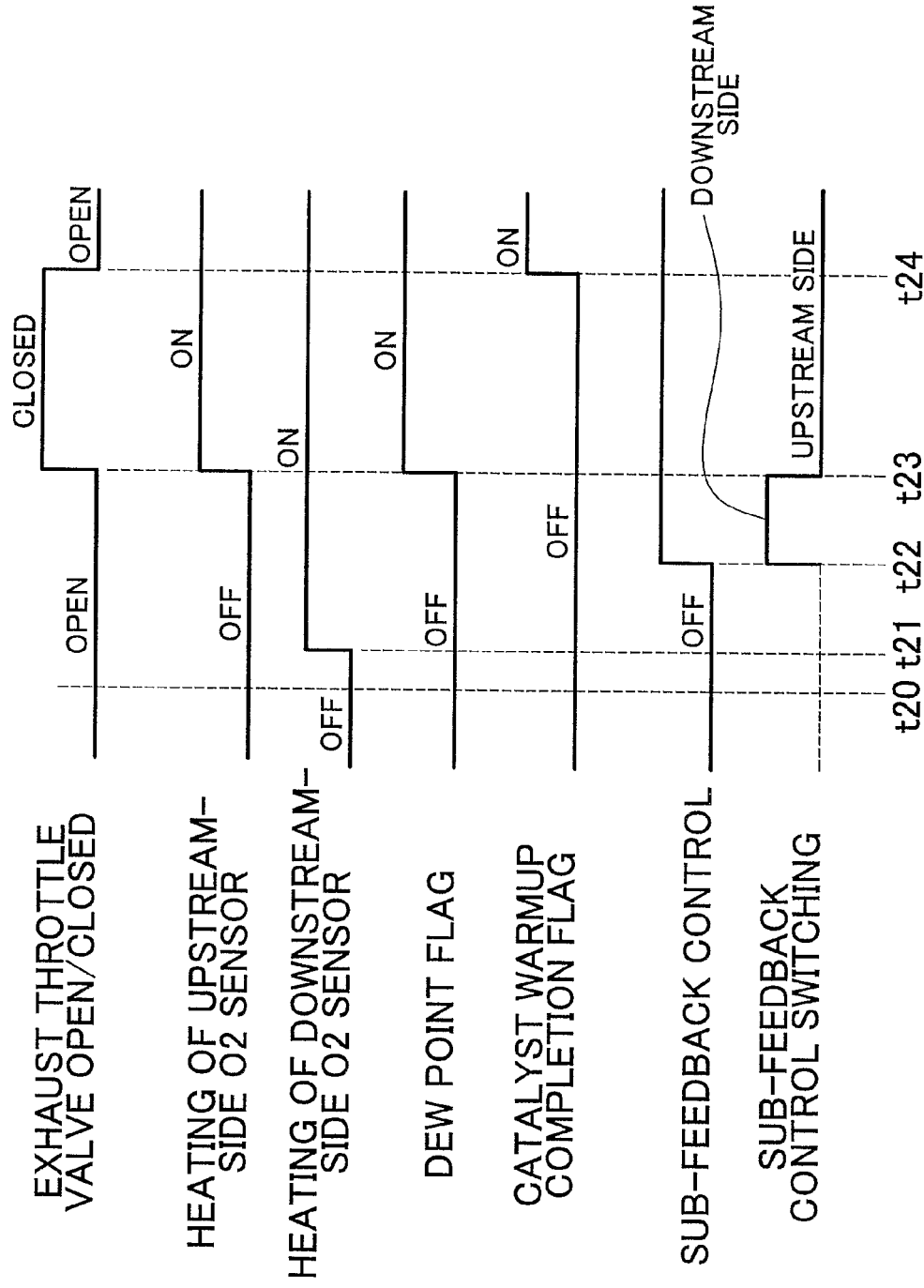

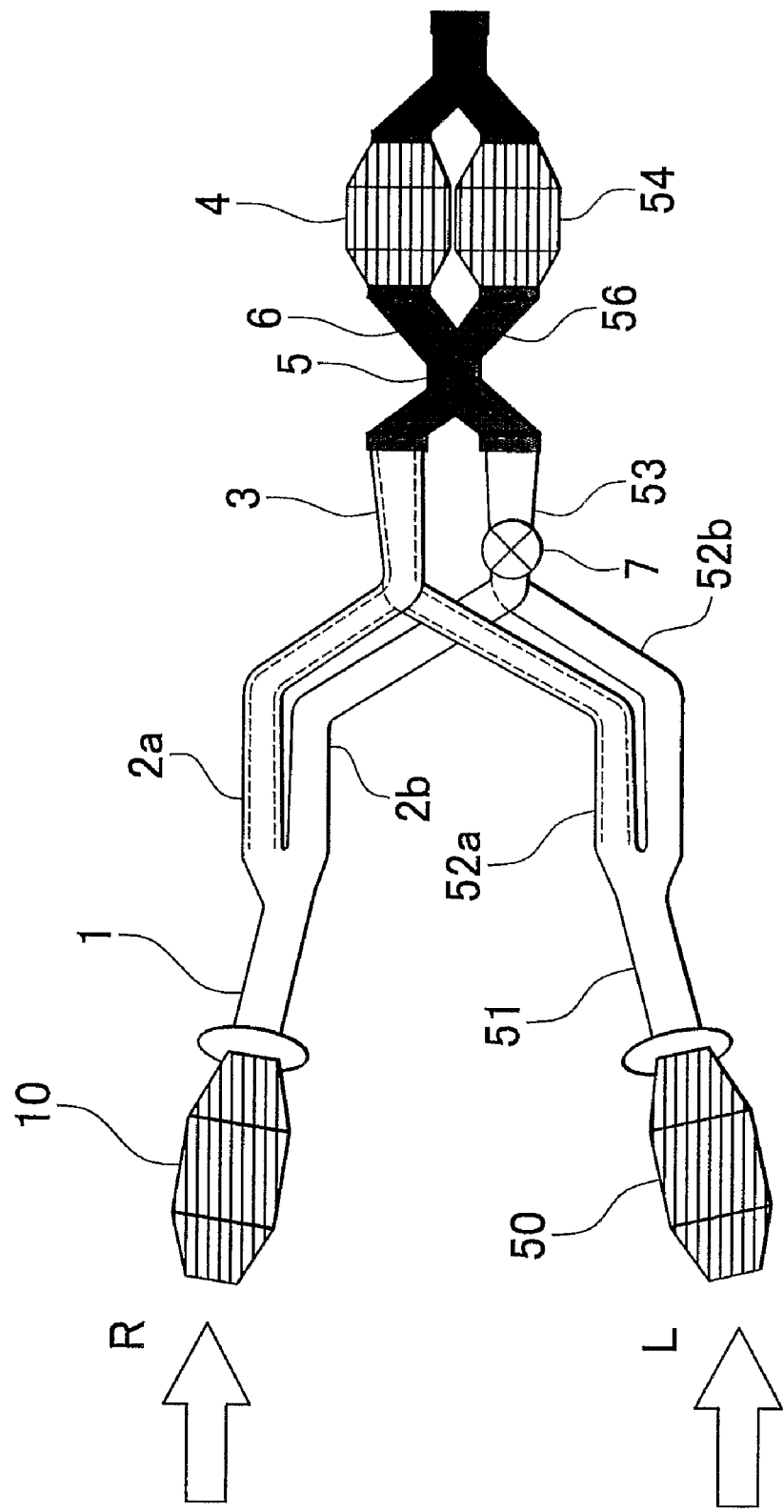

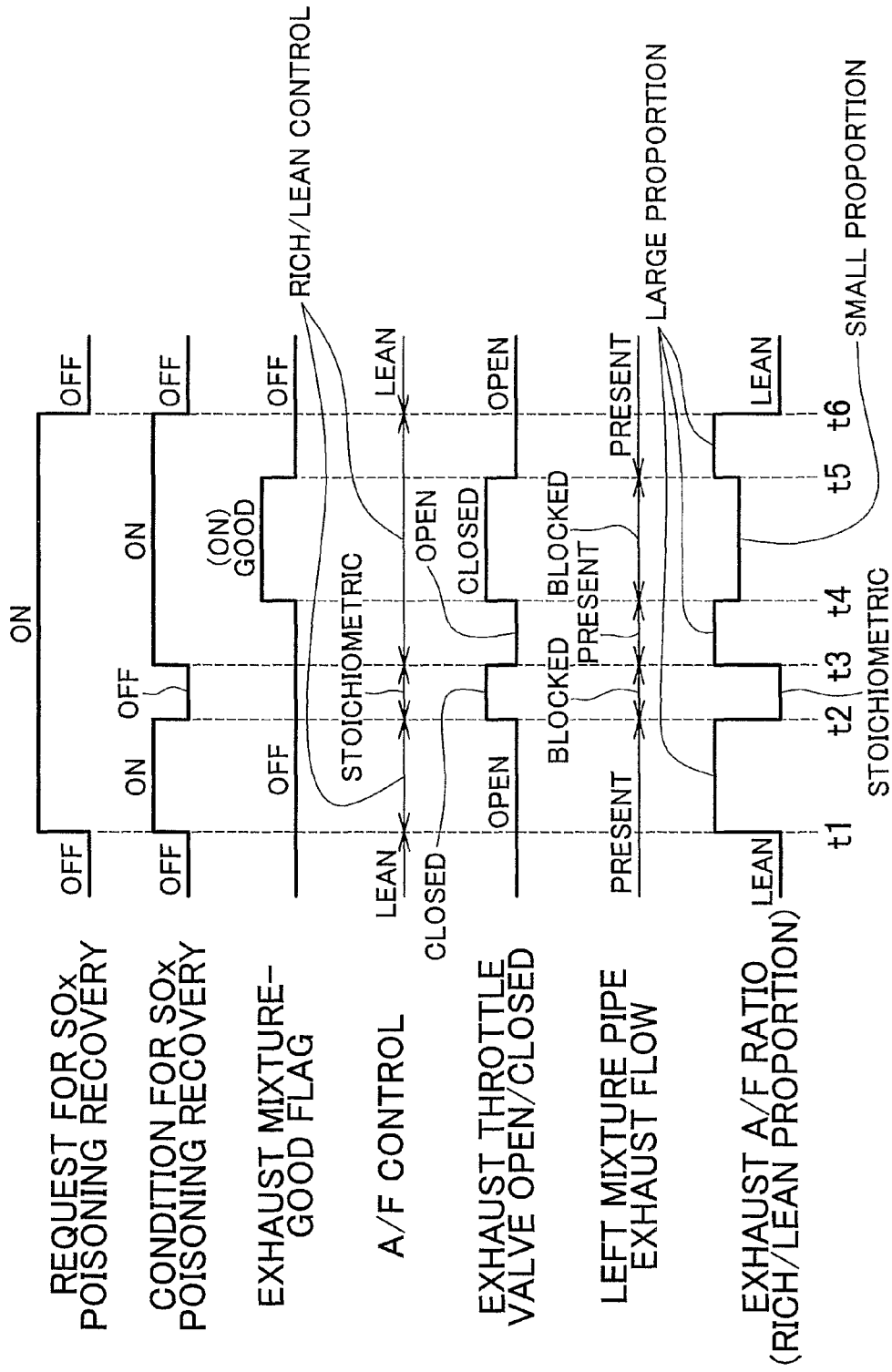

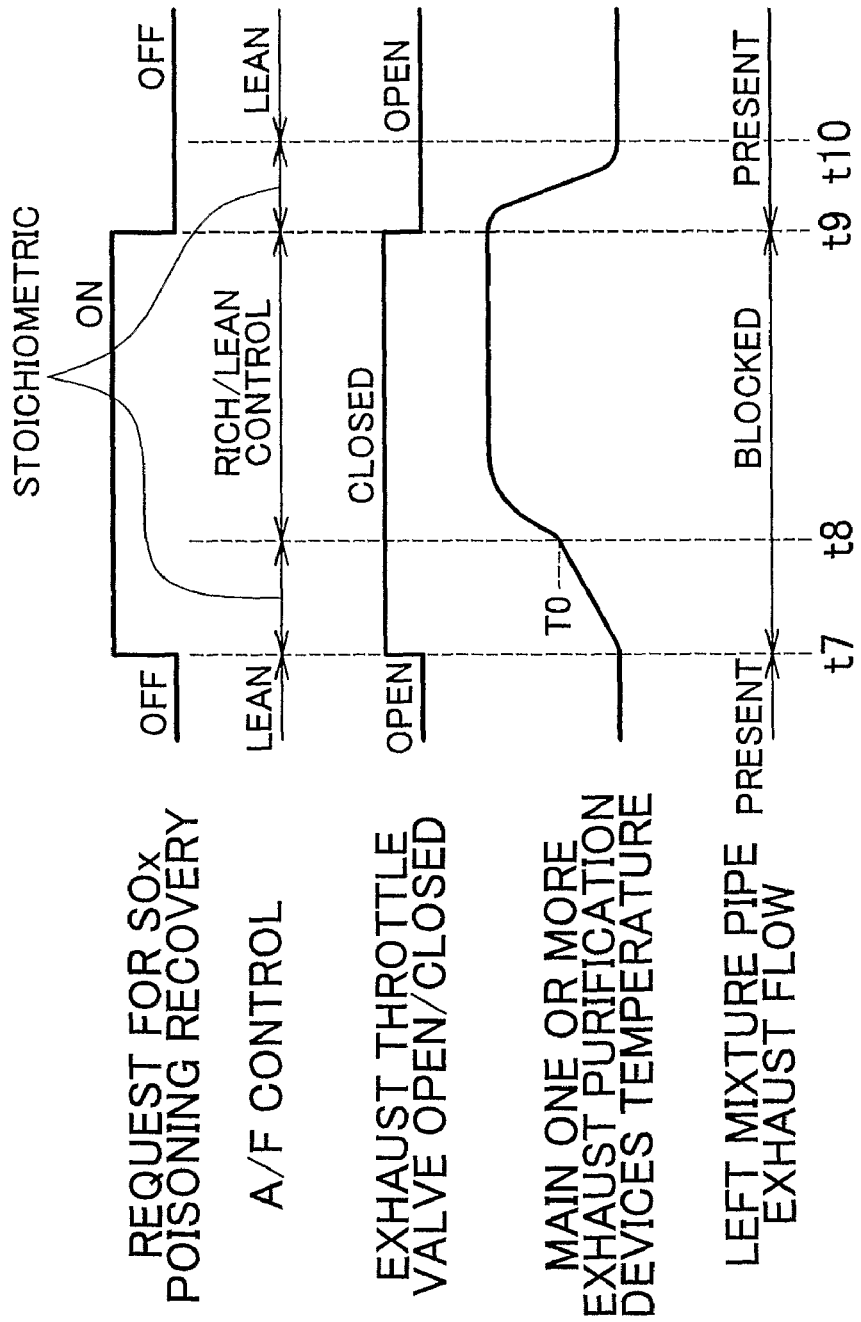

EXHAUST PURIFICATION SYSTEM FOR INTERNAL COMBUSTION ENGINE

BACKGROUND OF THE INVENTION

1. Field of the Invention

The invention relates to an exhaust purification system for an internal combustion engine.

2. Description of the Related Art

The exhaust from an internal combustion engine contains harmful substances such as NOx and the like. It is known that in order to lessen the emission of such harmful substances, the exhaust system of an internal combustion engine is provided with an exhaust purification device that includes a NOx catalyst for removing NOx from exhaust.

The exhaust purification device that includes a NOx catalyst is able to remove NOx while the temperature thereof is kept at or above the activation temperature of the catalyst. Therefore, at the time of cold start of the internal combustion engine, the temperature of the exhaust purification device has not reached the activation temperature of the catalyst, so that sufficient removal of NOx from exhaust may become difficult and emissions may deteriorate. Therefore, at the time of cold start of the internal combustion engine, it is necessary to quickly raise the temperature of the exhaust purification catalyst to or above the activation temperature of the catalyst so as to allow removable of NOx from the exhaust.

In conjunction with a case where an internal combustion engine equipped with an exhaust purification device as described above has a plurality cylinder groups, a construction in which a dual-construction exhaust purification device is disposed downstream of the point of confluence of streams of exhaust from the cylinder groups is described in Japanese Patent Application Publication No. JP-A-2002-364352. In such an exhaust purification system, too, it is necessary that at the time of cold start, the temperature of the dual-construction exhaust purification device be raised quickly.

If the above-described exhaust purification device employs, for example, a three-way catalyst as a NOx catalyst, the device is able to remove HC, CO and NOx simultaneously in a nearly stoichiometric atmosphere. Furthermore, if, for example, a storage reduction type NOx catalyst is provided as a NOx catalyst, the device is able to remove NOx from exhaust due to the function of storing NOx from exhaust when the oxygen concentration in inflow exhaust is high, and of reducing stored NOx when the oxygen concentration in inflow exhaust has dropped and a reductant is present.

The NOx removal performance of the storage reduction type NOx catalyst deteriorates if the amount of NOx stored therein increases. Therefore, the storage reduction type NOx catalyst is supplied with a reductant to reduce and release NOx stored (hereinafter, referred to as "NOx reduction process"). In some other cases, in order to resolve the SOx poisoning in which SOx from exhaust is stored in the NOx catalyst and deteriorates the NOx removal performance, the catalyst temperature of the NOx catalyst is raised and a reductant is supplied thereto (hereinafter, referred to as "SOx poisoning recovery process").

Furthermore, in the exhaust purification system including a dual-construction exhaust purification device, the storage reduction type NOx catalyst, as for example, has the functions of storing and reducing NOx from exhaust when the temperature of the catalyst is within the range of 350° C. to 450° C. Therefore, the purification efficiency of the exhaust purification device depends on the temperature of the exhaust introduced into the device. Therefore, in some cases, it is difficult to maintain high purification efficiency of the exhaust purification device in a wide range of operation states from a low-load/low-rotation speed operation state to a high-load/high rotation speed operation state.

SUMMARY OF THE INVENTION

Accordingly, it is a first object of the invention to provide, in an exhaust purification system for purifying exhaust from a plurality of cylinder groups of an internal combustion engine, a technology capable of more quickly activating the catalyst in the exhaust purification system at the time of cold start of the internal combustion engine. Furthermore, it is a second object of the invention to provide, in an exhaust purification system for an internal combustion engine having a plurality of cylinder groups, a technology capable of attaining high exhaust purification efficiency in a wider range of operation states.

In order to achieve the foregoing objects, the exhaust purification system of the invention is an exhaust purification system for an internal combustion engine which comprises an exhaust passageway through which exhausts discharged from a plurality of cylinder groups pass, and one or more exhaust purification devices that are provided in the exhaust passageway and that purify the exhausts, wherein the exhaust passageway comprises: cylinder group-directly coupled exhaust passageways which are connected respectively to the plurality of cylinder groups, and through which the exhausts discharged from the cylinder groups pass, and a number of which is equal to a number of the cylinder groups; cylinder group-respective branch passageways which are formed by division of each cylinder group-directly coupled exhaust passageway, numbers of the cylinder group-respective branch passageways of the individual cylinder group-directly coupled exhaust passageways being equal; mixture exhaust passageways each of which is formed by joining one of the cylinder group-respective branch passageways dividing from each one of the cylinder group-directly coupled exhaust passageways, with respect to all the cylinder group-directly coupled exhaust passageways, a number of the mixture exhaust passageways being equal to a number of cylinder group-respective branch passageways formed for a cylinder group; a junction mixture exhaust passageway formed by junction of all the mixture exhaust passageways; and exhaust amount control means provided for at least one of the mixture exhaust passageways for controlling an amount of exhaust that passes through the at least one of the mixture exhaust passageways, and wherein an exhaust that passes through the junction mixture exhaust passageway is introduced into the one or more exhaust purification devices.

Furthermore, in order to achieve the first object, the exhaust amount control means may reduce the amount of exhaust that passes through at least one of the mixture exhaust passageways over a predetermined period after beginning of a cold start of the internal combustion engine.

That is, the exhaust discharged from each cylinder group is divided so as to pass a plurality of cylinder group-respective branch passageways. At the time of cold start of the internal combustion engine, the exhaust that passes through one or more of the cylinder group-respective branch passageways is reduced in amount by the exhaust amount control means. Therefore, the exhaust from the internal combustion engine passes concentratedly through cylinder group-respective branch passageways that are not provided with the exhaust amount control means.

Hence, in view of the whole exhaust from the internal combustion engine, the surface area of the outside-contacting surfaces along the passage of the exhaust through the cylinder group-respective branch passageways can be relatively made smaller. As a result, the amount of heat release to the outside from the whole exhaust discharged from the internal combustion engine can be reduced, and the temperature of the exhaust introduced into the exhaust purification devices can be relatively raised. Therefore, at the time of cold start of the internal combustion engine, too, the temperature of the exhaust purification devices can be quickly raised, and deterioration of emissions can be substantially prevented.

The "predetermined period" herein means a period defined as follows. That is, it is judged that the exhaust purification devices can be sufficiently quickly brought to a high temperature by reducing the amount of exhaust that passes through at least one of the mixture exhaust passageway through the use of the exhaust amount control means over that period. As for the predetermined period, it is permissible to use a value that has been empirically determined beforehand as a constant value, or to select one of different values depending on the initial water temperature and the operation state of the internal combustion engine. The predetermined period may also be set as a period up to the end of warmup of the exhaust purification devices, during which the amount of exhaust through at least one of the mixture exhaust passageways is kept reduced.

Examples of the exhaust amount control means include valve devices, such as an exhaust throttle valve, a three-way valve, etc., as well as shutter devices and the like.

Furthermore, in the invention, an integrated amount of intake air or an integrated amount of fuel injection following the beginning of the cold start of the internal combustion engine may be estimated, and the predetermined period may be set as a period lasting until an estimated value of the integrated amount of intake air or the integrated amount of fuel injection exceeds a predetermined value, and the exhaust amount control means may increase the amount of exhaust that passes through the at least one of the mixture exhaust passageways after elapse of the predetermined period from the beginning of the cold start of the internal combustion engine.

Incidentally, in the case where the integrated amount of intake air following the beginning of cold start of the internal combustion engine is estimated, the aforementioned predetermined value is an integrated amount of intake air that serves as a threshold value for allowing judgment that the temperature of the exhaust purification devices has sufficiently risen and therefore the warmup is completed when the predetermined value-corresponding amount of air has been taken in after the beginning of the cold start of the internal combustion engine. Similarly, in the case where the integrated amount of fuel injection is estimated, the aforementioned predetermined value is an integrated amount of fuel injection that serves as a threshold value for allowing judgment that the temperature of the exhaust purification devices has sufficiently risen and therefore the warmup is completed when the predetermined value-corresponding amount of fuel has been injected following the beginning of the cold start of the internal combustion engine.

That is, according to the foregoing description, during the period lasting until the temperature of the exhaust purification devices has sufficiently risen, the amount of exhaust that passes through the mixture exhaust passageway provided with the exhaust amount control means is kept reduced by the exhaust amount control means. Therefore, the temperature of the exhaust purification devices can be efficiently raised. Furthermore, since the amount of exhaust that passes through the mixture exhaust passageway is not reduced for an unnecessarily long period by the exhaust amount control means, unnecessary restriction of the amount of flow of exhaust from the internal combustion engine is avoided, so that restriction of the allowable operation state and the output of the internal combustion engine can be curbed.

Furthermore, in the invention, the exhaust amount control means may be an exhaust throttle valve provided in at least one of the mixture exhaust passageways, and the amount of exhaust that passes through the at least one of the mixture exhaust passageways may be increased or decreased by opening or closing the exhaust throttle valve, and an air-fuel ratio sensor capable of detecting the air-fuel ratio of exhaust when activated by heating may be provided at an upstream side and/or a downstream side of the one or more exhaust purification devices, and heating of the air-fuel ratio sensor may be stopped when the exhaust throttle valve is opened during the predetermined period.

Incidentally, it is desirable that the air-fuel ratio of the exhaust from the internal combustion engine be controlled with good precision in order for the exhaust purification devices to achieve efficient NOx removal. To that end, in the invention, the air-fuel ratio sensor capable of detecting the air-fuel ratio of exhaust when activated by heating is provided at the upstream side and/or the downstream side of the exhaust purification devices. Furthermore, the exhaust amount control means is the exhaust throttle valve provided in at least one of the mixture exhaust passageways, and the amount of exhaust that passes through the at least one mixture exhaust passageway is controlled by opening and closing the exhaust throttle valve.

In the above-described case, considering only the exhaust temperature raising effect, it is advisable, from an idealistic viewpoint, that the exhaust throttle valve be closed throughout the aforementioned predetermined period at the time of the beginning of cold start of the internal combustion engine, and the exhaust throttle valve be opened after the predetermined period elapses. However, in that case, there is a possibility that during the period of closure of the exhaust throttle valve, the exhaust checked by the exhaust throttle valve may cool to produce condensed water in the mixture exhaust passageway. If the exhaust throttle valve is opened when such condensed water is present, the exhaust, starting to flow, blows the condensed water downstream, so that splashed water may deposit on the air-fuel ratio sensor, and therefore may break or damage the air-fuel ratio sensor due to heat shock.

To cope with this problem, the heating of the air-fuel ratio sensor is stopped when the exhaust throttle valve is opened, in the invention. Therefore, by the time when condensed water is blown downward, the temperature of the air-fuel ratio sensor has lowered. Therefore, the breakage or damage of the air-fuel ratio sensor caused by heat shock at the time of deposition of condensed water can be substantially prevented.

On this occasion, the exhaust throttle valve may be opened after elapse of a predetermined delay time following stop of the heating of the air-fuel ratio sensor. Therefore, the temperature of the air-fuel ratio sensor can be more reliably made low at the time when the exhaust throttle valve is opened. Hence, the breakage or damage of the air-fuel ratio sensor caused by the heat shock can be more reliably prevented.

Furthermore, in the invention, during at least a portion of the predetermined period, an operation of opening the exhaust throttle valve and stopping the heating, and an operation of closing the exhaust throttle valve and beginning the heating may be alternated.

Therefore, exhaust can be allowed to flow through the mixture exhaust passageway provided with the exhaust throttle valve little by little during the predetermined period, and the temperature of the mixture exhaust passageway near the exhaust throttle valve can be raised. Therefore, the temperature of the mixture exhaust passageway near the exhaust throttle valve can be kept near or at or above the dew point during the predetermined period as well. As a result, the deposition of condensed water on the air-fuel ratio sensor at the time of opening the exhaust throttle valve can be more reliably prevented.

Furthermore, in the invention, air-fuel ratio sensors may be provided at an upstream side and a downstream side of the one or more exhaust purification devices, and if heating of the air-fuel ratio sensor provided at the upstream side of the one or more exhaust purification devices is stopped, an air-fuel ratio control of the internal combustion engine may be performed by using an output of the air-fuel ratio sensor provided at the downstream side of the one or more exhaust purification devices.

That is, during the state where the heating of the air-fuel ratio sensor provided at the upstream side of the exhaust purification devices is stopped, the air-fuel ratio of the exhaust introduced into the exhaust purification devices cannot be accurately detected. Therefore, during this state, the control of the air-fuel ratio of exhaust in the internal combustion engine is performed by using the output of the air-fuel ratio sensor provided at the downstream side of the exhaust purification devices. Incidentally, since condensed water as mentioned above is unlikely to be blown to the downstream side of the exhaust purification devices, the heating of the air-fuel ratio sensor at the downstream side of the exhaust purification devices can be continued regardless of the opening/closure of the exhaust throttle valve.

Therefore, the control of the air-fuel ratio of the internal combustion engine can be continued regardless of the open/closed state of the exhaust throttle valve, and deterioration of emissions of the internal combustion engine can be substantially prevented.

Furthermore, in the invention, if a temperature of the mixture exhaust passageway provided with the exhaust throttle valve becomes equal to or higher than a dew point during a stop of the heating of the air-fuel ratio sensor provided at the upstream side, the heating of the air-fuel ratio sensor provided at the upstream side of the one or more exhaust purification devices may be begun and the air-fuel ratio control of the internal combustion engine may be performed by using an output of the air-fuel ratio sensor provided at the upstream side of the one or more exhaust purification devices.

That is, if the temperature of the mixture exhaust passageway provided with the exhaust throttle valve becomes equal to or higher than the dew point, the heating of the air-fuel ratio sensor at the upstream side of the exhaust purification devices will not cause breakage or damage of the air-fuel ratio sensor regardless of the open/closed state of the exhaust throttle valve since condensed water does not exist. On the other hand, from the view point of the air-fuel ratio control of the internal combustion engine, it is desirable to perform the air-fuel ratio control through the use of the output of the air-fuel ratio sensor provided at the upstream side of the exhaust purification devices since the upstream-side air-fuel ratio sensor has less detection delay for changes in the air-fuel ratio than the downstream-side sensor.

Therefore, even during a stop of the heating of the upstream-side air-fuel ratio sensor, it is permissible to start the heating of the air-fuel ratio sensor provided at the upstream side of the exhaust purification devices and perform the air-fuel ratio control of the internal combustion engine through the use of the output of the air-fuel ratio sensor provided at the upstream side of the exhaust purification devices if the temperature of the mixture exhaust passageway provided with the exhaust throttle valve becomes equal to or higher than the dew point. Therefore, in a situation where condensed water does not exist, the air-fuel ratio control can be performed by preferentially using the upstream-side air-fuel ratio sensor, so that the control of the air-fuel ratio can be performed more precisely.

Furthermore, in the invention, the exhaust amount control means may be an exhaust throttle valve provided in at least one of the mixture exhaust passageways, and the amount of exhaust that passes through the at least one of the mixture exhaust passageways may be increased or decreased by opening or closing the exhaust throttle valve, and an air-fuel ratio sensor capable of detecting the air-fuel ratio of exhaust when activated by heating may be provided at an upstream side and/or a downstream side of the one or more exhaust purification devices. Immediately after the cold start of the internal combustion engine begins during the predetermined period, the exhaust throttle valve may be opened and heating of the air-fuel ratio sensor may be stopped. If a temperature of the mixture exhaust passageway provided with the exhaust throttle valve becomes equal to or higher than a dew point during the predetermined period, the heating of the upstream-side air-fuel ratio sensor may be performed and the exhaust throttle valve may be closed.

Therefore, the heating of the upstream-side air-fuel ratio sensor is performed after the temperature of the mixture exhaust passageway has become equal to or higher than the dew point. Hence, the deposition of condensed water on an upstream-side heater can be more reliably prevented.

In order to the aforementioned second object of the invention, the exhaust passageway may have temperature retention means which is provided for one or more cylinder group-respective branch passageways among the plurality of cylinder group-respective branch passageways provided for each cylinder group-directly coupled exhaust passageway, and which substantially prevents heat release to outside from the exhaust that passes through the one or more cylinder group-respective branch passageways, and a portion of the mixture exhaust passageways may be a temperature retention means-equipped mixture exhaust passageway formed by joining a cylinder group-respective branch passageway provided with the temperature retention means among the plurality of cylinder group-respective branch passageways dividing from each one of the cylinder group-directly coupled exhaust passageways, with respect to all the cylinder group-directly coupled exhaust passageways.

That is, the exhaust discharged from each cylinder group of the internal combustion engine is divided to pass through the cylinder group-respective branch passageways. As for the exhaust that passes through one or more cylinder group-respective branch passageways, its temperature is kept high by the temperature retention means. On the other hand, as for the exhaust that passes through the other cylinder group-respective branch passageways, its heat is allowed to be released to the outside, so that its temperature lowers. The temperature retention means-equipped mixture exhaust passageway formed by joining cylinder group-respective branch passageway provided with the temperature retention means, and the mixture exhaust passageway formed by joining cylinder group-respective branch passageways not provided with temperature retention means are joined together, so that the exhaust kept at high temperature and the exhaust of reduced temperature are mixed. On that occasion, using the exhaust amount control means, the amount of exhaust that passes through the mixture exhaust passageway is changed, in other words, the mixture ratio between the two exhausts is changed, so as to control the temperature of the mixed exhaust.

Therefore, by changing the mixture ratio in accordance with the operation state of the internal combustion engine, the exhaust having a temperature that allows the exhaust purification devices to attain high purification efficiency can be introduced into the exhaust purification devices from the junction mixture exhaust passageway, regardless of the operation state of the internal combustion engine. As a result, high exhaust purification efficiency can be attained in a wide range of operation states of the internal combustion engine.

The temperature retention means may be realized by providing at least a portion of the cylinder group-respective branch passageways with a double-layer pipe structure. Therefore, the layer of air filling the gap between the two layered pipe walls will enhance the temperature retaining characteristic of the cylinder group-respective branch passageways without remarkably increasing the heat capacity of the cylinder group-respective branch passageways.

The exhaust amount control means may be realized by an exhaust throttle valve provided in at least one of the mixture exhaust passageways. Therefore, with a simple construction, the amounts of exhaust that pass through the mixture exhaust passageways can be changed, and therefore the mixture ratio between the exhaust that passes through the mixture exhaust passageway and the exhaust that passes through the temperature retention means-equipped mixture exhaust passageway can be more reliably changed.

Furthermore, in the invention, the one or more exhaust purification devices may include a storage reduction type NOx catalyst. If a SOx poisoning recovery with respect to the storage reduction type NOx catalyst is requested, a rich/lean control in which the air-fuel ratio of the exhaust from one or more cylinder groups among the plurality of cylinder groups is brought to a predetermined rich air-fuel ratio and in which the air-fuel ratio of the exhaust from the other one or more cylinder groups among the plurality of cylinder groups is brought to a predetermined lean air-fuel ratio may be performed, and the exhaust throttle valve may be opened.

In the SOx poisoning recovery process of the storage reduction type NOx catalyst, the rich/lean control in which the air-fuel ratio of the exhaust from one or more cylinder groups among the plurality of cylinder groups is brought to a predetermined rich air-fuel ratio and in which the air-fuel ratio of the exhaust from the other one or more cylinder groups among the plurality of cylinder groups is brought to a predetermined lean air-fuel ratio is sometimes performed. Through the rich/lean control, sufficient amounts of fuel and air are introduced into the storage reduction type NOx catalyst, so that the temperature of the storage reduction type NOx catalyst can be raised and the reduction and release of SOx will be promoted.

In the rich/lean control, the air-fuel ratio of exhaust that is finally introduced into the storage reduction type NOx catalyst needs to be stoichiometric. Therefore, the exhausts from the plurality of cylinder groups need to be more homogeneously mixed before the air-fuel ratio of the whole exhaust is controlled. Therefore, by opening the exhaust throttle valve, the exhausts having passed though the mixture exhaust passageway and the temperature retention means-equipped mixture exhaust passageway can be more reliably mixed in the junction mixture exhaust passageway, and therefore the degree of homogeneity of exhaust can be improved. As a result, the air-fuel ratio of exhaust introduced into the storage reduction type NOx catalyst can be more reliably controlled to a stoichiometric air-fuel ratio, and therefore the process efficiency of the SOx poisoning recovery process can be improved.

Furthermore, in the case where the exhaust throttle valve is provided in the mixture exhaust passageway, the exhaust throttle valve may be closed when the operation state of the internal combustion engine belongs to a predetermined good mixture operation state where the state of mixture of exhaust in the temperature retention means-equipped mixture exhaust passageway is good even if it is during a period during which the SOx poisoning recovery process is requested.

Incidentally, the amounts of exhaust from the plurality of cylinder groups and the cycle of pulsation vary depending on the operation state of the internal combustion engine. Therefore, depending on the operation state of the internal combustion engine, exhaust may be sufficiently mixed even when the exhaust throttle valve remains closed, in other words, even when only the exhaust that passes through the temperature retention means-equipped mixture exhaust passageway is introduced into the exhaust purification devices. In such cases, the exhaust throttle valve may be closed even during the period during which the SOx poisoning recovery process is requested.

Therefore, the exhaust throttle valve is not opened if the opening thereof is not necessary, so that in the exhaust that passes through the junction mixture exhaust passageway, the amount of exhaust having passed through the temperature retention means-equipped mixture exhaust passageway can be relatively increased with respect to the amount of exhaust having passed through the mixture exhaust passageway. Therefore, the temperature of the exhaust introduced into the exhaust purification devices can be raised. As a result, the temperature of the storage reduction type NOx catalyst can be kept at temperatures that are closer to the temperature that is needed for SOx poisoning recovery.

Furthermore, similarly to the above description, in the case where the exhaust throttle valve is provided in the mixture exhaust passageway, the rich/lean control may be interrupted and the exhaust throttle valve may be closed if the operation state of the internal combustion engine deviates from an operation state suitable for the rich/lean control during the period when the SOx poisoning recovery process is requested.

Incidentally, as for the operation state of the internal combustion engine, the state deviated from the operation state suitable for the rich/lean control refers to a state, for example, an idling state, a full acceleration requested state, etc., in which continuation of the rich/lean control may lead to unstable combustion or knocking. In the invention, if the operation state of the internal combustion engine deviates from the operation state suitable for the rich/lean control during the period when the SOx poisoning recovery process is requested, the rich/lean control is interrupted and the exhaust throttle valve is closed.

Therefore, during the period when the SOx poisoning recovery is requested, occurrence of combustion failure or knocking can be substantially prevented. Furthermore, during the period when the operation state of the internal combustion engine is deviated from the operation state suitable for the rich/lean control, the proportion of the amount of exhaust having passed through the temperature retention means-equipped mixture exhaust passageway to the entire amount of exhaust introduced into the storage reduction type NOx catalyst can be increased, so that the temperature of the storage reduction type NOx catalyst can be kept at temperatures near the temperature that is needed for SOx reduction/discharge. As a result, if the operation state of the internal combustion engine returns to the operation state suitable for the rich/lean control, the reduction/release of SOx can be quickly resumed.

Furthermore, during the execution of the above-described rich/lean control, a richness/leanness proportion may be changed in accordance with opening/closure of the exhaust throttle valve. For example, in the case where the exhaust throttle valve is provided in the mixture exhaust passageway, the richness/leanness proportion may be made smaller during the closed state of the exhaust throttle valve than during the open state thereof.

That is, as described above, by opening or closing the exhaust throttle valve (e.g., by closing the exhaust throttle valve in the case where the exhaust throttle valve is provided in the mixture exhaust passageway), the temperature of the storage reduction type NOx catalyst can be raised to a temperature that is closer to the temperature needed for SOx poisoning recovery. Therefore, even if the richness/leanness proportion in the rich/lean control is made smaller so as to decrease the amounts of fuel and air introduced into the storage reduction type NOx catalyst, the temperature of the storage reduction type NOx catalyst can still be kept at a temperature that is necessary for SOx poisoning recovery.

Therefore, if the temperature of the storage reduction type NOx catalyst is raised by opening or closing the exhaust throttle valve, the air-fuel ratio of exhaust from each cylinder group in the rich/lean control can be brought closer to the stoichiometric air-fuel ratio, so that the combustion in the internal combustion engine will be stabilized and the occurrence of combustion failure and knocking can be more reliably prevented. Incidentally, the richness/leanness proportion herein is a numerical value that indicates to what percentage toward the rich or lean side with respect to the stoichiometric air-fuel ratio the air-fuel ratio of the exhaust discharged from each cylinder group is controlled in the rich/lean control. It can be said that the smaller the value of the richness/leanness proportion, the closer the air-fuel ratio of the exhaust discharged from each cylinder group is to the stoichiometric air-fuel ratio.

Furthermore, as described above, in the case where the exhaust throttle valve is provided in the mixture exhaust passageway and where if the operation state of the internal combustion engine deviates from the operation state suitable for the rich/lean control during the presence of the request for SOx poisoning recovery, the rich/lean control is interrupted and the exhaust throttle valve is closed, it is permissible that, in conjunction with the closure of the exhaust throttle valve, the air-fuel ratios of the exhausts from the cylinder groups be brought to the stoichiometric air-fuel ratio.

That is, in the above-described control, during the period when the SOx poisoning recovery process is requested, the rich/lean control is interrupted if the operation state of the internal combustion engine deviates from the operation state suitable for the rich/lean control. In this case, if the air-fuel ratio of the exhaust discharged from each cylinder group during the interruption of the rich/lean control is returned to, for example, a lean air-fuel ratio, it may be difficult to remove NOx from the exhaust since the temperature of the storage reduction type NOx catalyst is high.

Therefore, in the invention, the air-fuel ratio of the exhaust discharged from each cylinder group during the interruption of the rich/lean control is brought to the stoichiometric air-fuel ratio. Hence, it becomes possible to remove NOx from the exhaust by the three-way catalytic function of the storage reduction type NOx catalyst even though the storage reduction type NOx catalyst has high temperature during the SOx poisoning recovery process. As a result, the deterioration of emissions during the interruption of the rich/lean control can be substantially prevented.

Furthermore in the invention, the one or more exhaust purification devices may include a storage reduction type NOx catalyst, and if a SOx poisoning recovery process with respect to the storage reduction type NOx catalyst is requested: over a first predetermined period, the air-fuel ratios of the exhausts from the plurality of cylinder groups may be brought to a stoichiometric air-fuel ratio and a temperature of the exhaust that passes through the junction mixture exhaust passageway may be raised by the exhaust amount control means; after the predetermined period elapses, a rich/lean control in which the air-fuel ratio of the exhaust from one or more cylinder groups among the plurality of cylinder groups is brought to a predetermined rich air-fuel ratio and in which the air-fuel ratio of the exhaust from the other one or more cylinder groups among the plurality of cylinder groups is brought to a predetermined lean air-fuel ratio may be performed, and a temperature of the exhaust that passes through the junction mixture exhaust passageway may be brought to a predetermined temperature that allows the SOx poisoning recovery of the one or more exhaust purification devices by the exhaust amount control means; and over a second predetermined period following removal of a request for the SOx poisoning recovery, the air-fuel ratios of the exhausts from the plurality of cylinder groups may be brought to the stoichiometric air-fuel ratio, and the temperature of the exhaust that passes through the junction mixture exhaust passageway may be lowered by the exhaust amount control means.

The case where in order to raise the temperature of the storage reduction type NOx catalyst through the above-described rich/lean control in the SOx poisoning recovery process, the ordinary lean air-fuel ratio-based operation is directly shifted to the rich/lean control, as for example, will be considered below. In this case, since the temperature of the storage reduction type NOx catalyst has to be considerably raised, the richness/leanness proportion in the rich/lean control needs to be made large. However, if the richness/leanness proportion is made large, knocking or unstable combustion may be caused in some cases, depending on the operation state of the internal combustion engine, according to the related art.

Furthermore, if at the time of removal of the request for the SOx poisoning recovery, the stop of the rich/lean control is directly followed by, for example, the lean air-fuel ratio-based operation, there sometimes occurs a case where the storage reduction type NOx catalyst cannot store NOx until the temperature of the storage reduction type NOx catalyst sufficiently lowers, according to the related art. In those cases, there may be deterioration of emissions during the period lasting until the temperature of the storage reduction type NOx catalyst sufficiently lowers.

Therefore, in the invention, during the first predetermined period after the SOx poisoning recovery process is requested, the air-fuel ratios of the exhausts from the cylinder groups are brought to the stoichiometric air-fuel ratio, and the temperature of the exhaust that passes through the junction mixture exhaust passageway is raised by the exhaust amount control means.

Therefore, the temperature of the storage reduction type NOx catalyst can be raised to a certain degree beforehand, at the time of the shift to the rich/lean control. Hence, it is possible to prevent the richness/leanness proportion from becoming excessively large when the operation shifts to the rich/lean control. As a result, the occurrence of combustion failure and knocking in the internal combustion engine during the rich/lean control can be substantially prevented.

Furthermore, since the air-fuel ratios of the exhausts discharged from the cylinder groups during the first predetermined period are made stoichiometric, NOx can be removed by the three-way catalytic function of the storage reduction type NOx catalyst even if the temperature of the storage reduction type NOx catalyst rises to a temperature range where the storage of NOx is difficult.

Furthermore, in the invention, since the temperature of the exhaust that passes through the junction mixture exhaust passageway is lowered by the exhaust amount control means over the second predetermined period following the removal of the request for the SOx poisoning recovery process, the temperature of the storage reduction type NOx catalyst can be quickly lowered. Furthermore, since the air-fuel ratios of the exhausts from the cylinder groups are brought to the stoichiometric air-fuel ratio during the second predetermined period, NOx can be favorably removed even during a period when the temperature of the storage reduction type NOx catalyst has not sufficiently lowered.

Furthermore, in the invention, each one of the plurality of cylinder groups may form a corresponding one of a plurality of banks provided in the internal combustion engine. Therefore, the rich/lean control can be realized in, for example, a V-type internal combustion engine, by controlling the air-fuel ratios of the individual banks.

Another exhaust purification system in accordance with the invention for achieving the aforementioned first and second objects comprises an exhaust passageway through which exhausts discharged from a plurality of cylinder groups of the internal combustion engine pass, and one or more exhaust purification devices which are provided in the exhaust passageway, and into which exhaust that passes through a junction mixture exhaust passageway described below is introduced, and which purifies the exhaust. The exhaust passageway includes: cylinder group-directly coupled exhaust passageways which are connected respectively to the plurality of cylinder groups, and through which the exhausts discharged from the cylinder groups pass, and a number of which is equal to a number of the cylinder groups; cylinder group-respective branch passageways which are formed by division of each cylinder group-directly coupled exhaust passageway, numbers of the cylinder group-respective branch passageways of the individual cylinder group-directly coupled exhaust passageways being equal; mixture exhaust passageways each of which is formed by joining one of the cylinder group-respective branch passageways dividing from each one of the cylinder group-directly coupled exhaust passageways, with respect to all the cylinder group-directly coupled exhaust passageways, a number of the mixture exhaust passageways being equal to a number of cylinder group-respective branch passageways formed for a cylinder group; a junction mixture exhaust passageway formed by junction of all the mixture exhaust passageways; and an exhaust amount control portion which is provided for at least one of the mixture exhaust passageways and which controls an amount of exhaust that passes through the at least one of the mixture exhaust passageways.

Incidentally, the means for solving the problems in the invention may be used in any possible combinations.

In accordance with the invention, the exhaust purification system for purifying exhausts from a plurality of cylinder groups of an internal combustion engine is able to quickly activate the catalyst within the exhaust purification system at the time of beginning of cold start of the internal combustion engine. Furthermore, the system is able to attain high exhaust purification efficiency in a wide range of operation states.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 5 is a time chart illustrating the control at the time of cold start of the internal combustion engine in accordance with a third embodiment of the invention;

FIG. 6 is a time chart illustrating another mode of the control at the time of cold start of the internal combustion engine in accordance with the third embodiment of the invention;

FIG. 7 is a diagram schematically illustrating a construction of an exhaust purification system in a fourth embodiment of the invention;

FIG. 8 is a time chart illustrating changes in control-related factors at the time of the SOx poisoning recovery process in a fifth embodiment of the invention;

FIG. 9 is a time chart illustrating changes in control-related factors at the time of the SOx poisoning recovery process in a sixth embodiment of the invention.

DETAILED DESCRIPTION OF THE PREFERRED EMBODIMENTS

In the following description, the invention will be described in more detail in terms of exemplary embodiments.

Best modes for carrying out the invention will be exemplarily described hereinafter with reference to the drawings.

Figure 1:
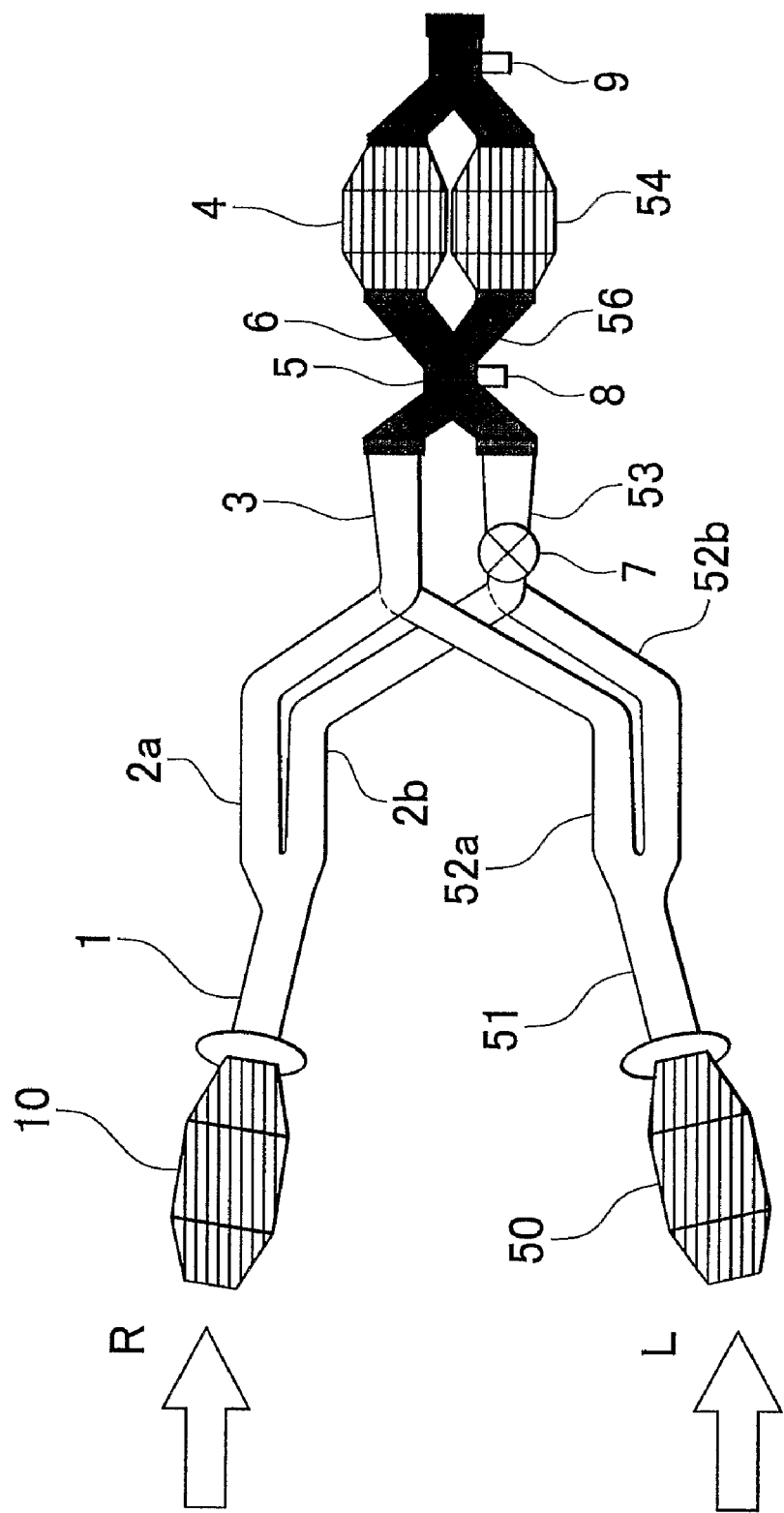
FIG. 1 is a diagram schematically illustrating a construction of an exhaust purification system in a first embodiment of the invention.

FIG. 1 is a diagram schematically showing a construction of an exhaust purification system in accordance with a first embodiment of the invention. In FIG. 1, an exhaust purification system in relation to an internal combustion engine having two banks, that is, a right-side bank and a left-side bank, for example, a V-type internal combustion engine. A right-side initial-stage exhaust purification device 10 in FIG. 1 receives inflow exhaust from a right-side bank (not shown), and performs exhaust purification during a cold state. Similarly, a left-side initial-stage exhaust purification device 50 receives inflow exhaust from a left-side bank (not shown), and performs exhaust purification during a cold state. The exhaust having passed through the right-side initial-stage exhaust purification device 10 flows into a right-side exhaust pipe 1. The exhaust having passed through the left-side initial-stage exhaust purification device 50 flows into a left-side exhaust pipe 51. The right-side exhaust pipe 1 is divided, in partway, into two right-side branch pipes 2a, 2b. Similarly, the left-side exhaust pipe 51 is divided, in partway, into two left-side branch pipes 52a, 52b.

Incidentally, the right-side exhaust pipe 1 and the left-side exhaust pipe 51 correspond to cylinder group-directly coupled exhaust passageways. The right-side branch pipes 2a, 2b and the left-side branch pipes 52a, 52b correspond to cylinder group-respective branch passageways.

On a further downstream side in the exhaust purification system, the right-side branch pipe 2a and the left-side branch pipe 52a are joined to form a right-side mixture pipe 3. On the other hand, the right-side branch pipe 2b and the left-side branch pipe 52b are joined to form a left-side mixture pipe 53. On a further downstream side, the right-side mixture pipe 3 and the left-side mixture pipe 53 are joined to form a junction mixture pipe 5. The junction mixture pipe 5 is divided into a right-side second mixture pipe 6 and a left-side second mixture pipe 56, which are provided with a right-side main exhaust purification device 4 and a left-side main exhaust purification device 54, respectively. Incidentally, the right-side mixture pipe 3 and the left-side mixture pipe 53 correspond to mixture exhaust passageways. The junction mixture pipe 5 corresponds to a junction mixture exhaust passageway.

In this embodiment, the right-side initial-stage exhaust purification device 10 and the left-side initial-stage exhaust purification device 50 each include a three-way catalyst. The three-way catalyst is a catalyst that converts CO, HC and NOx from an exhaust produced by combustion at or near the theoretical air-fuel ratio into $CO_2$, $H_2O$ and $N_2$. The catalyst may be formed, for example, by supporting a mixture of Pt and Rh or a mixture of Pt, Pd and Rh on alumina.

On the other hand, the right-side main exhaust purification device 4 and the left-side main exhaust purification device 54 each include a storage reduction type NOx catalyst. The storage reduction type NOx catalyst is formed by using alumina as a support and supporting, on the support, a noble metal, such as Pt or the like, and at least one element selected from alkali metals, such as K, Na, Li, etc., alkaline earth metals, such as Ba, Ca, etc., and rare earths, such as La, Y, etc.

The junction mixture pipe 5 disposed upstream of the right-side main exhaust purification device 4 and the left-side main exhaust purification device 54 is provided with an upstream-side $O_2$ sensor 8 which is heated by electrification of a heater and which, during an activated state of a sensor element provided therein, is capable of detecting the oxygen concentration. Similarly, a joined portion downstream of the right-side main exhaust purification device 4 and the left-side main exhaust purification device 54 is provided with a downstream-side $O_2$ sensor 9. Furthermore, the left-side mixture pipe 53 is provided with an exhaust throttle valve 7 that controls the amount of exhaust that passes through the left-side mixture pipe 53 through opening and closing actions. Incidentally, the upstream-side $O_2$ sensor 8 and the downstream-side $O_2$ sensor 9 correspond to air-fuel ratio sensors. The exhaust throttle valve 7 corresponds to exhaust amount control means.

In this exhaust purification system, A/F sensors (not shown) are provided near the right-side initial-stage exhaust purification device 10 and the left-side initial-stage exhaust purification device 50. The air-fuel ratios of exhausts from the right-side bank and the left-side bank are controlled through a main feedback control using the outputs of the A/F sensors, and a sub-feedback control using the output of the upstream-side $O_2$ sensor 8 or the downstream-side $O_2$ sensor 9.

The temperature range in which the right-side main exhaust purification device 4 and the left-side main exhaust purification device 54 are able to efficiently store NOx is set as 350° C. to 450° C. In some cases at the time of cold start of an internal combustion engine, the temperature of the right-side main exhaust purification device 4 and the left-side main exhaust purification device 54 is below the aforementioned temperature range, so that the NOx removal efficiency drops and emissions deteriorate, according to the related art.

Therefore, in this embodiment, during a state of low NOx removal efficiency of the right-side main exhaust purification device 4 and the left-side main exhaust purification device 54 following the beginning of cold start of the internal combustion engine, the exhaust throttle valve 7 is closed. Hence, exhaust cannot pass through either one of the right-side branch pipe 2b and the left-side branch pipe 52b, and the amounts of exhaust that otherwise would pass therethrough pass through the right-side branch pipe 2a and the left-side branch pipe 52a, in a concentrated fashion. Thus, the surface area of the exhaust passageways through which the entire amount of exhaust from the internal combustion engine passes becomes smaller, and the exhaust heat released to the outside of the exhaust passageways reduces. As a result, the high temperature of exhaust can be substantially maintained, so that the temperature of the right-side main exhaust purification device 4 and the left-side main exhaust purification device 54 can be quickly raised.

Figure 2:
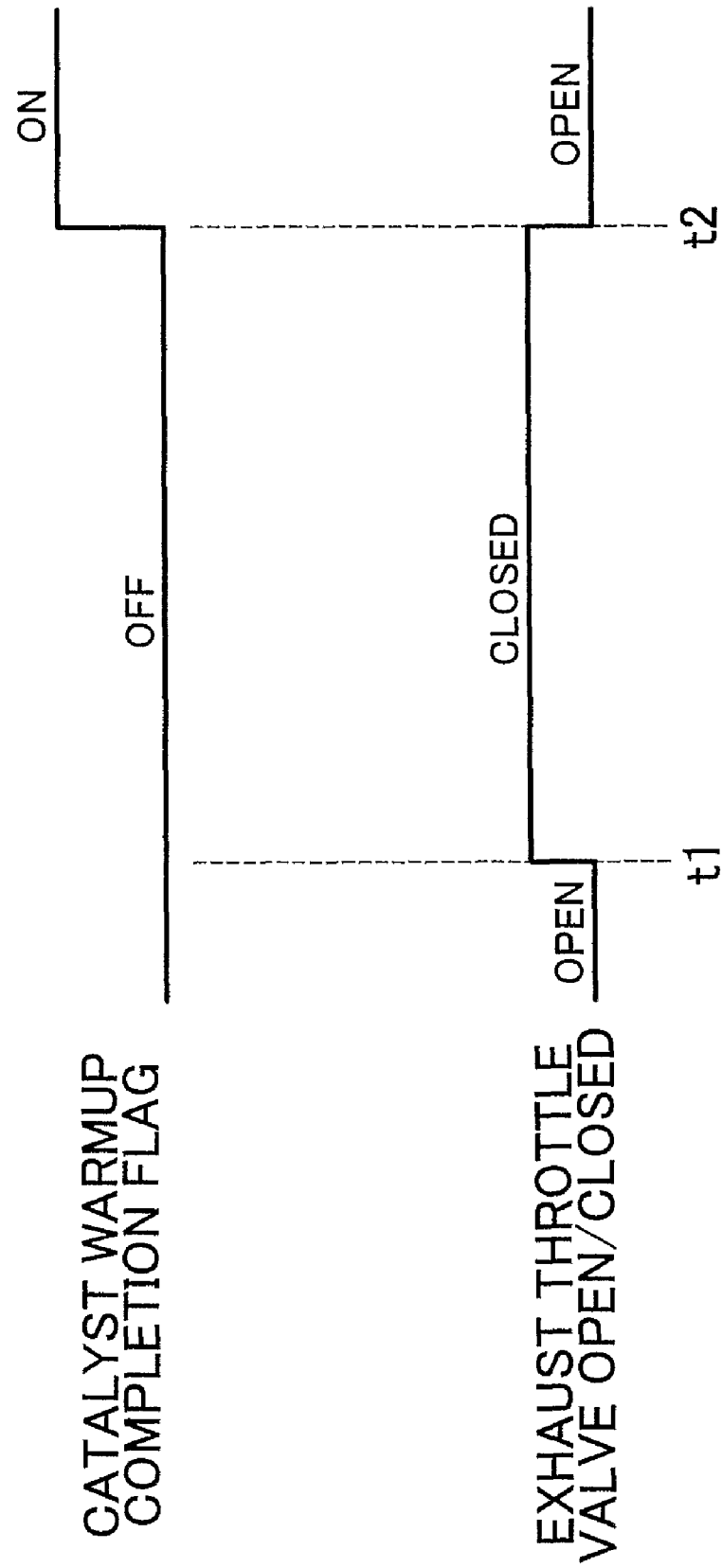
FIG. 2 is a time chart illustrating a control performed at the time of cold start of an internal combustion engine in accordance with the first embodiment of the invention.

FIG. 2 is a time chart illustrating a control performed at the time of a cold start in the above-described exhaust purification system. An upper portion of the chart indicates changes of a catalyst warmup completion flag before, at and after the beginning of start of the internal combustion engine, and a lower portion indicates opening and closing actions of the exhaust throttle valve 7 before, at and after the beginning of start of the engine. The catalyst warmup completion flag is a flag that is turned on when the integrated amount of intake air following the beginning of start of the internal combustion engine reaches a warmup completion amount of air. The warmup completion amount of air is an integrated value of the amount of intake air which allows determination that the temperature of the right-side main exhaust purification device 4 and the left-side main exhaust purification device 54 has sufficiently risen and therefore sufficient exhaust purification efficiency can be attained, and which is empirically determined beforehand. Incidentally, the warmup completion amount of air corresponds to a predetermined value that is used in the case where the integrated amount of intake air following the beginning of cold start of the internal combustion engine is estimated.

In FIG. 1, it is assumed that the starting of the internal combustion engine is begun at a time point t1. At that time point, the exhaust throttle valve 7 is closed. From that time point on, the detection of the integrated amount of intake air of the internal combustion engine is begun. Then, if the catalyst warmup completion flag is turned on at a time point t2, the exhaust throttle valve 7 is opened at that time point.

According to this embodiment, the exhaust throttle valve 7 remains closed until the temperature of the right-side main exhaust purification device 4 and the left-side main exhaust purification device 54 is sufficiently high so that sufficiently high efficiency of exhaust purification can be attained. Therefore, the passageway through which exhaust from the internal combustion engine passes can be concentrated to the right-side branch pipe 2a and the left-side branch pipe 52a among the right-side branch pipes 2a, 2b and the left-side branch pipes 52a, 52b. Hence, the release of heat from exhaust to the outside of the branch pipes can be relatively reduced, so that the temperature of exhaust can be kept high. As a result, the temperature of the right-side main exhaust purification device 4 and the left-side main exhaust purification device 54 can be efficiently raised. Incidentally, in the embodiment, the period of the time point t1 to the time point t2, that is, the period extending from the beginning of the cold start of the internal combustion engine to the turning-on of the catalyst warmup completion flag, corresponds to a predetermined period.

Next, a second embodiment of the invention will be described. In this embodiment, at the time of cold start of the internal combustion engine, the warmup of exhaust purification devices is accelerated, and breakage of $O_2$ sensors due to splashed water is prevented.

Figure 3:
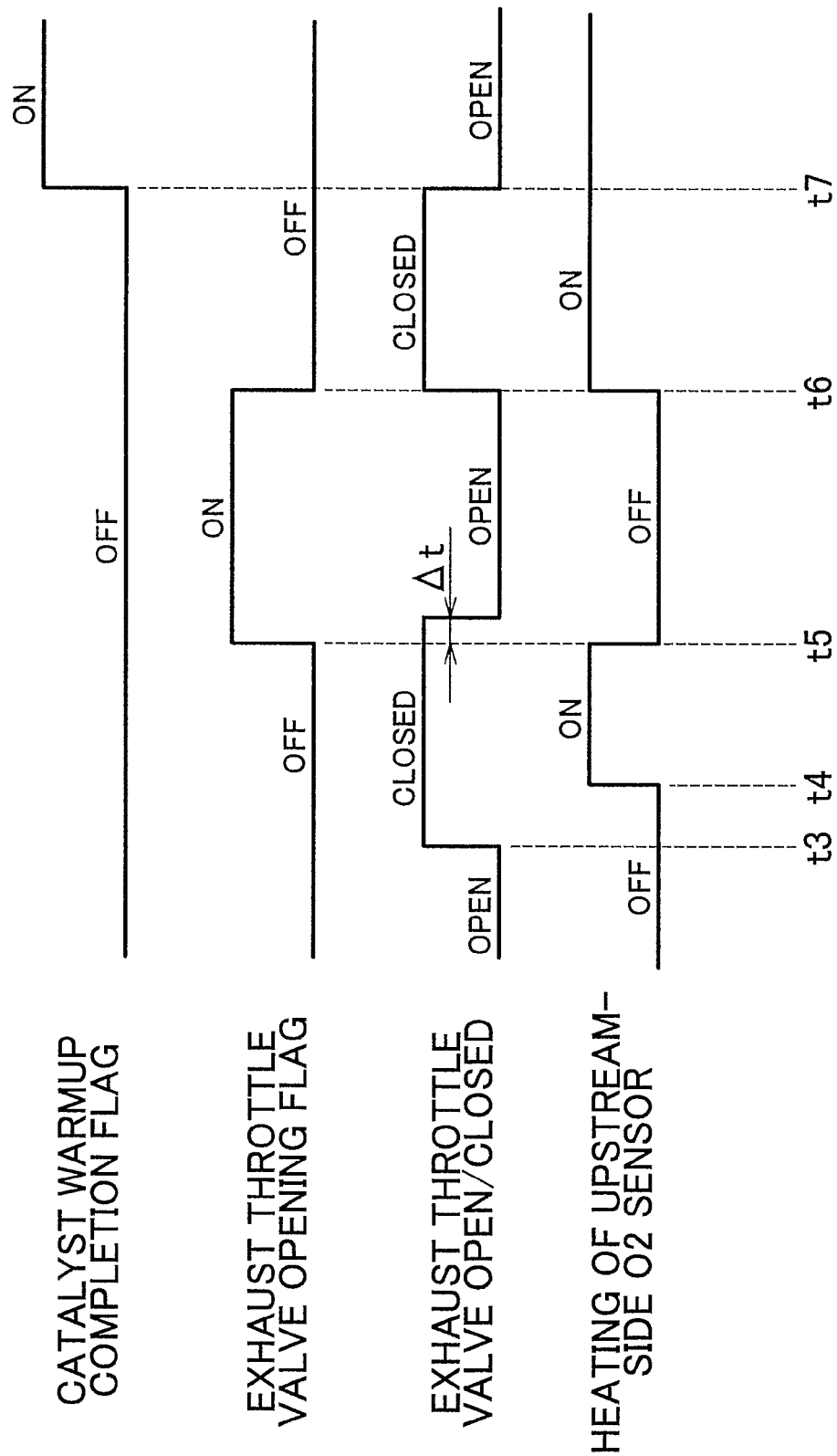
FIG. 3 is a time chart illustrating a control performed at the time of cold start of internal combustion engine in accordance with a second embodiment of the invention.

FIG. 3 is a time chart illustrating a control performed by an exhaust purification system in accordance with this embodiment at the time of cold start.

In FIG. 3, it is assumed that the starting of the internal combustion engine is begun at a time point t3. Then, as in the first embodiment, the exhaust throttle valve 7 is closed, and the detection of the integrated amount of intake air is begun. Furthermore, in this embodiment, the detection of the amount of intake air is begun in order to estimate the amount of depression of an accelerator pedal. In this embodiment, a setting is made such that when the detected amount of intake air exceeds a valve closure limit amount of air, an exhaust throttle valve opening flag is tuned on. The valve closure limit amount of air is a value of the amount of intake air as follows. That is, when the amount of intake air exceeds this value, the output of the internal combustion engine is restricted if the exhaust throttle valve 7 has been closed, or it is judged that the temperature of exhaust will be excessively high. The valve closure limit amount of air is empirically determined beforehand.

Then, at a time point t4, the heater for heating the sensor element of the upstream-side $O_2$ sensor 8 is electrified. As a result, the sensor element of the upstream-side $O_2$ sensor 8 is activated, so that the detection of oxygen concentration becomes possible.

Then, at a time point t5, it is assumed that the exhaust throttle valve opening flag is turned on. In this case, there is a possibility of occurrence of a defect as mentioned above if the exhaust throttle valve 7 remains closed. Therefore, the exhaust throttle valve 7 is opened.

However, in this embodiment, the turning-on of the exhaust throttle valve opening flag is not immediately followed by the opening of the exhaust throttle valve 7. First, the electrification of the heater of the upstream-side $O_2$ sensor 8 is discontinued. Then, after the elapse of a time delay $\Delta t$, that is, after the temperature of the upstream-side $O_2$ sensor 8 becomes sufficiently low, the exhaust throttle valve 7 is opened. Then, at a time point t6 when the exhaust throttle valve opening flag is turned off, the exhaust throttle valve 7 is closed and, simultaneously, the heater of the upstream-side $O_2$ sensor 8 is electrified. Incidentally, the time delay $\Delta t$ herein is a time that is needed for the temperature of the upstream-side $O_2$ sensor 8 to become sufficiently low after the discontinuation of the electrification of the heater of the upstream-side $O_2$ sensor 8, and corresponds to a predetermined delay time.

Next, if the catalyst warmup completion flag is turned on at t7, the exhaust throttle valve 7 is opened as in the first embodiment. It can be judged that at the time point of turning-on of the catalyst warmup completion flag, substantially no condensed water exists since the temperature near the exhaust throttle valve 7 in the left-side mixture pipe 53 has already been high or since the exhaust throttle valve 7 was opened and closed prior to that time point. Therefore, at this time point, the electrification of the heater of the upstream-side $O_2$ sensor 8 is not discontinued.

Thus, in this embodiment, in the case where the exhaust throttle valve 7 is opened while the catalyst warmup completion flag is off, the electrification of the heater of the upstream-side $O_2$ sensor 8 is always discontinued. Therefore, even if condensed water accumulated in the left-side mixture pipe 53 is blown and deposits on the upstream-side $O_2$ sensor pipe 8 upon the opening of the exhaust throttle valve 7, breakage of the upstream-side $O_2$ sensor 8 can be substantially avoided.

Another mode related to the control of the opening/closing of the exhaust throttle valve 7 and the electrification of the heater of the upstream-side $O_2$ sensor 8 will be described.

In conjunction with this mode, a control of alternately executing an operation of opening the exhaust throttle valve 7 and discontinuing the electrification of the heater of the upstream-side $O_2$ sensor 8 and an operation of closing the exhaust throttle valve 7 and electrifying the heater of the upstream-side $O_2$ sensor 8 while the catalyst warmup completion flag is off will be described.

Figure 4:
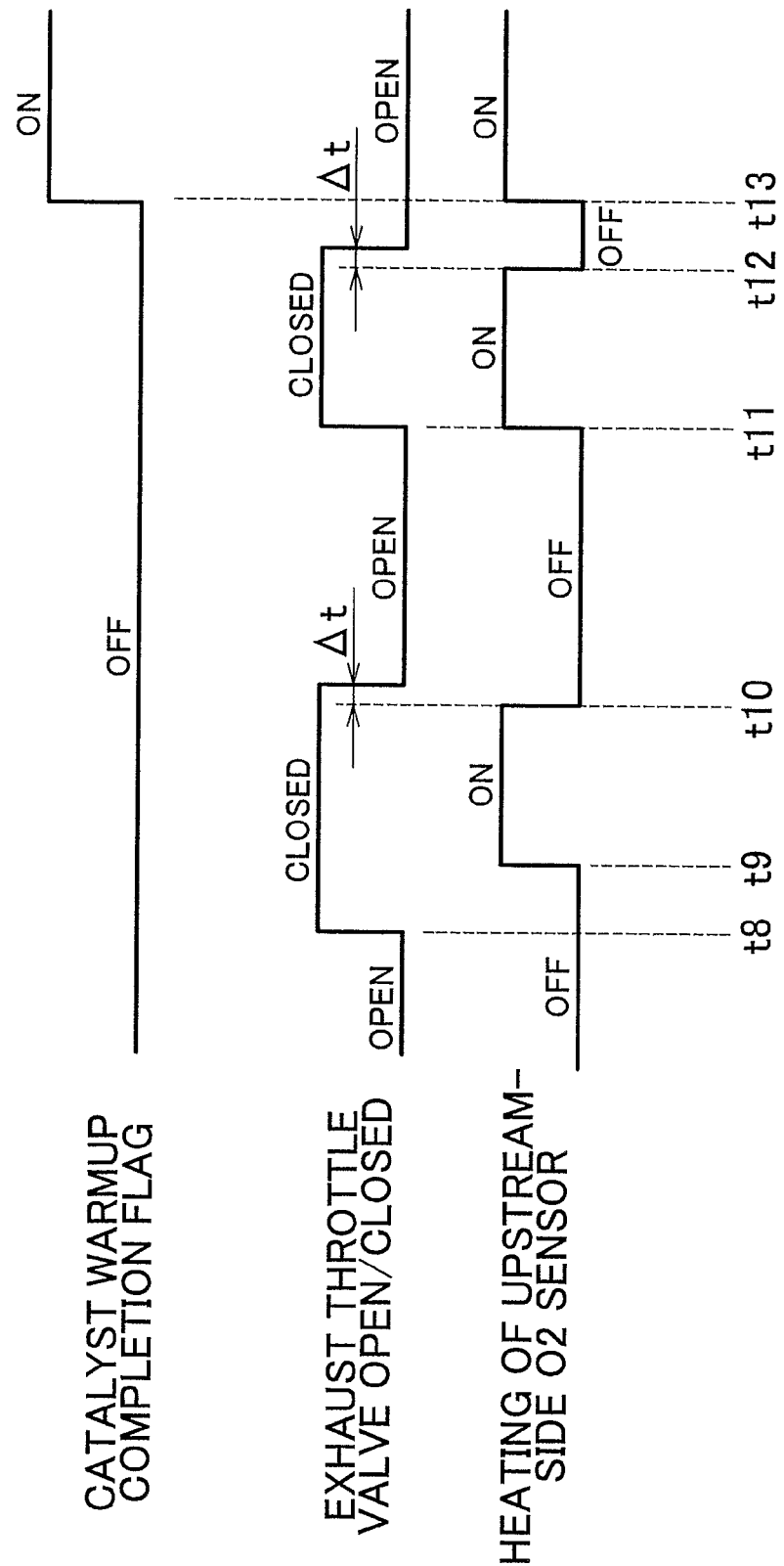
FIG. 4 is a time chart illustrating another mode of the control at the time of cold start of the internal combustion engine in accordance with the second embodiment of the invention.

FIG. 4 is a time chart illustrating a control of an exhaust purification system in accordance with this mode at the time of cold start. In FIG. 4, it is assumed that at a time point t8, the starting of the internal combustion engine begins. Next, at a time point t9, the heater of the upstream-side $O_2$ sensor 8 is electrified. Then, at a time point t10, the electrification of the heater of the upstream-side $O_2$ sensor 8 is discontinued. After a time delay $\Delta t$, the exhaust throttle valve 7 is opened. Then, at a time point t11, the heater of the upstream-side $O_2$ sensor 8 is electrified, and the exhaust throttle valve 7 is closed. Furthermore, at time point t12, the electrification of the heater of the upstream-side $O_2$ sensor 8 is discontinued. After the time delay $\Delta t$, the exhaust throttle valve 7 is opened.

Then, when the catalyst warmup completion flag is turned on at a time point t13, the open state of the exhaust throttle valve 7 is maintained and the heater of the upstream-side $O_2$ sensor 8 is electrified since it can be judged that the absence of condensed water has already established near the exhaust throttle valve 7 of the left-side mixture pipe 53.

Thus, in this mode, during the period when the catalyst warmup completion flag is off, the operation of discontinuing the electrification of the heater of the upstream-side $O_2$ sensor 8 and, after the time delay $\Delta t$, opening the exhaust throttle valve 7, and the operation of electrifying the heater of the upstream-side $O_2$ sensor 8 and closing the exhaust throttle valve 7 are alternated.

Therefore, during the warmup of the right-side main exhaust purification device 4 and the left-side main exhaust purification device 54, exhaust can be passed through the left-side mixture pipe 53 little by little, so that the temperature near the exhaust throttle valve 7 can be quickly raised to the dew point.

A third embodiment of the invention will be described. In this embodiment, while the heater of the upstream-side $O_2$ sensor 8 is not electrified, the control of the air-fuel ratio of the internal combustion engine is performed through the use of the downstream-side $O_2$ sensor 9. In conjunction with a mode that will be first described below, the precondition is that since the exhaust throttle valve 7 is closed immediately following the beginning of the starting of the engine, the catalyst warmup completion flag is turned on sooner than the temperature near the exhaust throttle valve 7 reaches the dew point.

FIG. 5 is a time chart illustrating a control performed by an exhaust purification system in accordance with this embodiment at the time of cold start. In this embodiment, the starting of the internal combustion engine is begun at a time point t14. Subsequently at a time point t15, the heaters of the upstream-side $O_2$ sensor 8 and the downstream-side $O_2$ sensor 9 are electrified. After the warmup of the right-side initial-stage exhaust purification device 10 and the left-side initial-stage exhaust purification device 50 is completed, a sub-feedback control of the air-fuel ratio is begun at a time point t16.

At this time point, since the heater of the upstream-side $O_2$ sensor 8 is being electrified, the sub-feedback control of the air-fuel ratio is performed through the use of an output of the upstream-side $O_2$ sensor 8. Subsequently at a time point t17, it is assumed that the catalyst warmup completion flag (not shown) is turned on. At this time point, the closure of the exhaust throttle valve 7 is no longer needed. In this embodiment, however, since the temperature near the exhaust throttle valve 7 in the left-side mixture pipe 53 is still below the dew point at this time point, there is a possibility that condensed water may deposit on the upstream-side $O_2$ sensor 8, and therefore may break the upstream-side $O_2$ sensor 8 if the exhaust throttle valve 7 is opened. Therefore, the electrification of the heater of the upstream-side $O_2$ sensor 8 is discontinued at the time point t17. After the time delay $\Delta t$, the exhaust throttle valve 7 is opened.

Furthermore, in this embodiment, the sub-feedback control of the air-fuel ratio is changed so as to use the output of the downstream-side $O_2$ sensor 9 for the control. Therefore, even after the electrification of the heater of the upstream-side $O_2$ sensor 8 is discontinued, the air-fuel ratio control of the internal combustion engine can be continued through the use of the output of the downstream-side $O_2$ sensor 9.

Then, at t18, it is assumed that a dew point flag is turned on. The dew point flag is a flag for indicating that the temperature of exhaust through the left-side mixture pipe 53 has become equal to or higher than the dew point, which may be estimated from the amount of intake air or the integrated value of the amount of fuel injected. When the dew point flag is turned on, condensed water can no longer exist in the left-side mixture pipe 53, and therefore the heater of the upstream-side $O_2$ sensor 8 is electrified. Simultaneously, the sub-feedback control is switched to the sub-feedback control that uses the output of the upstream-side $O_2$ sensor 8. After that, the electrification of the heater of the downstream-side $O_2$ sensor 9 is discontinued.

As described above, in this embodiment, during the period of discontinuation of the electrification of the heater of the upstream-side $O_2$ sensor 8, the sub-feedback control is continued through the use of the output of the downstream-side $O_2$ sensor 9. Therefore, the control of the exhaust air-fuel ratio of the internal combustion engine can be continued regardless of the state of warmup of the right-side main exhaust purification device 4 and the left-side main exhaust purification device 54, the exhaust temperature, or the opening/closure of the exhaust throttle valve 7.

Furthermore, at the time point when the temperature near the exhaust throttle valve 7 in the left-side mixture pipe 53 reaches the dew point, the sub-feedback control is switched to the sub-feedback control that uses the output of the upstream-side $O_2$ sensor 8. Thus, if the upstream-side $O_2$ sensor 8 is usable, the output of the upstream-side $O_2$ sensor 8 is preferentially used for the control. Hence, the precision of the sub-feedback control can be improved as much as possible.

Another mode of this embodiment will be described. This mode illustrates a control performed in the case where the turn-on timing of the catalyst warmup completion flag comes later than the turn-on timing of the dew point flag because the exhaust throttle valve 7 is opened immediately following the beginning of the cold start of the engine as described below.

FIG. 6 is a time chart illustrating a control performed by an exhaust purification system in accordance with this mode at the time of cold start. In this mode, the starting of the internal combustion engine begins at a time point t20. At this time point, the exhaust throttle valve 7 is already open. Therefore, due to the possibility of splash of condensed water, the heater of the upstream-side $O_2$ sensor 8 is not electrified. Instead, the heater of the downstream-side $O_2$ sensor 9 is electrified at a time point t21. Then, at a time point t22, the sub-feedback control is begun. At this time, the output of the downstream-side $O_2$ sensor 9 is used to perform the sub-feedback control.

Then, at a time point t23, the dew point flag is turned on, that is, it is assumed that the temperature near the exhaust throttle valve 7 in the left-side mixture pipe 53 has reached the dew point. Therefore, the exhaust throttle valve 7 is closed at that time point. This closing operation is performed in order to complete the warmup of the right-side main exhaust purification device 4 and the left-side main exhaust purification device 54 as soon as possible.

At this time point, the heater of the upstream-side $O_2$ sensor 8 is electrified since a state where no condensed water can exist in the left-side mixture pipe 53 has already been established. Also at this time point, the sub-feedback control is switched to the sub-feedback control that uses the output of the upstream-side $O_2$ sensor 8. Then, as the catalyst warmup completion flag is turned on at a time point t24, the closure of the exhaust throttle valve 7 is no longer needed, and therefore the exhaust throttle valve 7 is opened.

In this mode of the embodiment, too, during the period of discontinuation of the electrification of the heater of the upstream-side $O_2$ sensor 8, the sub-feedback control is continued through the use of the output of the downstream-side $O_2$ sensor 9. Therefore, the control of the exhaust air-fuel ratio of the internal combustion engine can be continued regardless of the state of warmup of the right-side main exhaust purification device 4 and the left-side main exhaust purification device 54, the exhaust temperature, or the opening/closure of the exhaust throttle valve 7.

Furthermore, at the time point when the temperature in the left-side mixture pipe 53 reaches the dew point, the sub-feedback control is switched to the sub-feedback control that uses the output of the upstream-side $O_2$ sensor 8. Thus, if the upstream-side $O_2$ sensor 8 is usable, the output of the upstream-side $O_2$ sensor 8 is preferentially used for the control. Hence, the precision of the sub-feedback control can be improved as much as possible.

Furthermore, in this mode of the embodiment, the exhaust throttle valve 7 is kept open and the heater of the exhaust throttle valve 7 is not electrified during the period from the beginning of the start of the engine until the dew point flag is turned on. Therefore, until the temperature near the exhaust throttle valve 7 in the left-side branch pipe 52 reaches the dew point, occurrence of condensed water itself is suppressed and high temperature rise of the upstream-side $O_2$ sensor 8 is substantially prevented. Therefore, the breakage of the upstream-side $O_2$ sensor 8 due to splashed water can be more reliably prevented.

An exhaust purification system in accordance with a fourth embodiment of the invention will be described. The exhaust purification system of this embodiment, as compared with the foregoing exhaust purification systems of the first to third embodiments, has a double-layer pipe structure as shown in FIG. 7 in which a right-side branch pipe 2a, a left-side branch pipe 52a and a right-side mixture pipe 3 are formed by double-layer pipes each of which has an air-filled space between an inner pipe and an outer pipe. A left-side mixture pipe 53 is provided with an exhaust throttle valve 7 that controls the amount of exhaust that passes through a right-side branch pipe 2b, a left-side branch pipe 52b and the left-side mixture pipe 53. The double-layer pipe structure corresponds to temperature retention means. The right-side mixture pipe 3 corresponds to a temperature retention means-equipped exhaust passageway. The left-side mixture pipe 53 corresponds to a mixture exhaust passageway. Incidentally, it is not necessary that the right-side branch pipe 2a, the left-side branch pipe 52a and the right-side mixture pipe 3 be formed entirely by a double-layer pipe structure. It is appropriate that such a double-layer pipe structure be provided in such a range as to substantially produce a temperature retaining effect. Furthermore, it is not altogether necessary that the right-side mixture pipe 3 be formed by a double-layer pipe structure.

As for the right-side main exhaust purification device 4 and the left-side main exhaust purification device 54, the temperature range that allows efficient storage of NOx is about 350° C. to 450° C. Therefore, during an operation state where the amount of intake air is small and the temperature of exhaust introduced into the exhaust purification devices is low, or during an operation state where the amount of intake air is large and the temperature of exhaust introduced into the exhaust purification devices is high, the temperature of the right-side main exhaust purification device 4 and the left-side main exhaust purification device 54 deviates from the aforementioned range, so that the NOx removal efficiency drops and emissions deteriorate, according to the related art.

Therefore, in this embodiment, during the operation state where the amount of intake air is small and the temperature of exhaust introduced into the exhaust purification devices is low, or during an operation state where the catalyst temperature is low and the NOx removal efficiency of the right-side main exhaust purification device 4 and the left-side main exhaust purification device 54 drops, the exhaust throttle valve 7 is closed. Furthermore, during an operation state where the amount of intake air is large and the temperature of exhaust introduced into the exhaust purification devices is high, or during an operation state where the catalyst temperature is high and the NOx removal efficiency of the right-side main exhaust purification device 4 and the left-side main exhaust purification device 54 drops, the exhaust throttle valve 7 is opened.

That is, since the right-side branch pipe 2a, the left-side branch pipe 52a and the right-side mixture pipe 3 have a double-layer pipe structure as described above, the pipes have a good characteristic of retaining the exhaust temperature, so that the temperature of exhaust passing through the right-side mixture pipe 3 can be kept high. On the other hand, the right-side branch pipe 2b, the left-side branch pipe 52b and the left-side mixture pipe 53, not having a double-layer pipe structure, allow large amounts of release of exhaust heat to the outside, so that the temperature of exhaust passing through the left-side mixture pipe 53 can be made low.

Therefore, by closing the exhaust throttle valve 7, the right-side main exhaust purification device 4 and the left-side main exhaust purification device 54 are supplied preferentially with the exhaust whose temperature has been retained by the double-layer pipe structure. As a result, the temperature of the exhaust introduced into the right-side main exhaust purification device 4 and the left-side main exhaust purification device 54 can be raised. Opening the exhaust throttle valve 7, on the other hand, will reduce the proportion of the amount of exhaust whose temperature has been retained by the double-layer pipe structure to the entire amount of exhaust introduced into the right-side main exhaust purification device 4 and the left-side main exhaust purification device 54. As a result, the temperature of the exhaust introduced into the right-side main exhaust purification device 4 and the left-side main exhaust purification device 54 can be lowered.

Thus, during the state where the amount of intake air is small and the temperature of exhaust introduced into the exhaust purification devices is low or the state where the catalyst temperature is low, the temperature of exhaust introduced into the right-side main exhaust purification device 4 and the left-side main exhaust purification device 54 can be raised by closing the exhaust throttle valve 7. On the other hand, during the state where the amount of intake air is large and the temperature of exhaust introduced into the exhaust purification devices is high or the state where the catalyst temperature is high, the temperature of exhaust introduced into the right-side main exhaust purification device 4 and the left-side main exhaust purification device 54 can be lowered by closing the exhaust throttle valve 7. Therefore, over a wider range of operation states or of the catalyst temperature, efficient removal of NOx can be achieved by the right-side main exhaust purification device 4 and the left-side main exhaust purification device 54, and therefore deterioration of emissions can be curbed.

Incidentally, in the above-described control, it is advisable that the amount of control for opening and closing the exhaust throttle valve 7 be determined on the basis of the temperature of the right-side main exhaust purification device 4 or the left-side main exhaust purification device 54. Therefore, it becomes possible to directly control the catalyst temperature, which has great influence on the NOx removal efficiency of the right-side main exhaust purification device 4 and the left-side main exhaust purification device 54.

For example, it is possible to control the exhaust throttle valve 7 in a manner where the exhaust throttle valve 7 is closed if the temperature of the right-side main exhaust purification device 4 or the left-side main exhaust purification device 54 is 350° C. or lower, and the exhaust throttle valve 7 is opened if the temperature of the right-side main exhaust purification device 4 or the left-side main exhaust purification device 54 is 450° C. or higher. Therefore, over a wide range of operation states, the temperature of both the right-side main exhaust purification device 4 and the left-side main exhaust purification device 54 can be kept in the range of 350° C. to 450° C.

Incidentally, in the above-described construction, the temperature of the right-side main exhaust purification device 4 or the left-side main exhaust purification device 54 may be directly measured by a sensor or the like, or may also be estimated from the amount of intake air or the amount of fuel injection of the internal combustion engine.

In the foregoing embodiment, the exhaust throttle valve 7 corresponds to exhaust amount control means. It is not necessary that the exhaust throttle valve 7 be provided only in the left-side mixture pipe 53. It is also permissible that an exhaust throttle valve may be provided in the right-side mixture pipe 3 as well, and by opening and closing the two exhaust throttle valves, the amounts of exhaust that passes through the right-side mixture pipe 3 and the left-side mixture pipe 53 may be controlled. Furthermore, provision of an exhaust throttle valve 7 only in the right-side mixture pipe 3 also allows the temperature of exhaust to be relatively controlled by opening and closing the exhaust throttle valve. However, in terms of raising the temperature of exhaust introduced into the right-side main exhaust purification device 4 or the left-side main exhaust purification device 54, it can be said that it is desirable to provide an exhaust throttle valve at least in the left-side mixture pipe.

Furthermore, the devices or the like used as exhaust amount control means are not limited to an exhaust throttle valve, but may also be other devices such as a shutter and the like.

An exhaust purification system in accordance with a fifth embodiment of the invention will be described. The construction of the exhaust purification system of this embodiment is substantially the same as the construction of the system of the fourth embodiment. In conjunction with this embodiment, a control of a SOx poisoning recovery process for the right-side main exhaust purification device 4 and the left-side main exhaust purification device 54 will be described.

FIG. 8 is a time chart illustrating changes in related factors at the time of the SOx poisoning recovery process in this embodiment. In FIG. 8, the horizontal axis represents time, and the vertical axis represents changes in the individual factors.

In FIG. 8, it is assumed that the SOx poisoning recovery process is requested at a time point t1. If at that time point, a condition for SOx poisoning recovery is met, a so-called rich/lean control is begun in which the air-fuel ratio of the exhaust from the right-side bank is brought to a rich air-fuel ratio and in which the air-fuel ratio of the exhaust from the left-side bank is brought to a lean air-fuel ratio.

The rich/lean control will be briefly described. The air-fuel ratio of the exhaust from one of the banks is brought to a lean air-fuel ratio, and the air-fuel ratio of the exhaust from the other bank is brought to a rich air-fuel ratio. The lean air-fuel ratio exhaust and the rich air-fuel ratio exhaust are mixed to attain a stoichiometric air-fuel exhaust, which is supplied to the storage reduction NOx catalyst. Therefore, it becomes possible to cause $O_2$ and $NO_2$ contained in the lean air-fuel ratio exhaust, and HC and CO contained in the rich air-fuel ratio exhaust to participate in oxidation and reduction in proper amounts on the storage reduction type NOx catalyst so as to raise the temperature of the storage reduction type NOx catalyst.

Furthermore in FIG. 8, the state where the condition for SOx poisoning recovery is ON means that the present operation state of the internal combustion engine is appropriate for execution of the aforementioned rich/lean control. That is, the operation state of the internal combustion engine is not an idling state or a state where the accelerator pedal is depressed, but is a state where it is judged that the possibility of the execution of the rich/lean control causing unstable combustion or knocking is low. As for the condition for SOx poisoning recovery, it is permissible that an appropriate range of load and rotation speed of the engine may be determined empirically and arranged into a map beforehand, and that it may be determined whether the operation state of the internal combustion engine is within the range on the map.

In this embodiment, it is assumed that the exhaust throttle valve 7 has already been opened at a time point t1. Since there exists exhaust passing through the left-side mixture pipe 53 that does not have a double-layer structure, the exhaust through the right-side mixture pipe 3 and the exhaust through the left-side mixture pipe 53 join and mix in the junction mixture pipe 5. As a result, the homogeneity of the exhaust introduced into the right-side main exhaust purification device 4 and the left-side main exhaust purification device 54 is improved. Hence, the controllability of the air-fuel ratio of exhaust introduced into the right-side main exhaust purification device 4 and the left-side main exhaust purification device 54 also improves.

In this time period, there is a need to rapidly raise the temperature of the right-side main exhaust purification device 4 and the left-side main exhaust purification device 54. Therefore, there is a need to increase the richness/leanness proportion that represents the amount of change, from the stoichiometric air-fuel ratio, of the richness degree of the air-fuel ratio of the exhaust discharged from the right-side bank and the leanness degree of the air-fuel ratio of the exhaust discharged from the left-side bank at the time of beginning of the rich/lean control. For example, there is a need to obtain a richness/leanness proportion of ±20% by controlling the air-fuel ratio of the exhaust discharged from the right-side bank to 40% to the rich side from the stoichiometric air-fuel ratio, and the air-fuel ratio of the exhaust discharged from the left-side bank to 40% to the lean side from the stoichiometric air-fuel ratio.

Next, it is assumed that the condition for SOx poisoning recovery becomes unmet at a time point t2. Specifically, this falls in a case where the operation state of the internal combustion engine has shifted to an idling operation or a case where the accelerator is fully depressed.

In the aforementioned case, the rich/lean control is stopped, and the air-fuel ratios of the exhausts from the right-side bank and the left-side bank are controlled to the stoichiometric air-fuel ratio. Therefore, the combustion is stabilized, and occurrence of knocking can also be curbed. Furthermore, at this time point, the right-side main exhaust purification device 4 and the left-side main exhaust purification device 54 have reached such a high temperature (450° C. or higher) that the storage of NOx from lean air-fuel ratio exhaust into the device is difficult. Therefore, through the control of the air-fuel ratios of the exhausts from the right and left-side banks, NOx can be removed by the three-way catalytic function of the right-side main exhaust purification device 4 and the left-side main exhaust purification device 54.

At this time, the exhaust throttle valve 7 is closed. Therefore, it is possible to increase the proportion of the amount of exhaust whose temperature has been retained by the double-pipe structure to the entire amount of exhaust introduced into the right-side main exhaust purification device 4 and the left-side main exhaust purification device 54. Hence, it is possible to substantially prevent a significant temperature fall of the right-side main exhaust purification device 4 and the left-side main exhaust purification device 54.

Subsequently, if the condition for SOx poisoning recovery is met again at a time point t3, the rich/lean control is begun, and the exhaust throttle valve 7 is opened. Therefore, the right-side main exhaust purification device 4 and the left-side main exhaust purification device 54 are sufficiently raised. Furthermore, the exhausts from the right and left banks can be sufficiently mixed in the junction mixture pipe 5, thus enhancing the degree of homogenization.

Subsequently, it is assumed that at a time point t4, an exhaust mixture-good flag is turned on. The exhaust mixture-good flag is turned on if the operation state of the internal combustion engine is a state where it can be judged that the exhaust having passed through the right-side mixture pipe 3 is sufficiently homogenized even though the exhaust throttle valve 7 is closed. Therefore, if the exhaust mixture-good flag is on, it is not altogether necessary to promote the mixing of exhaust by opening the exhaust throttle valve 7, and therefore, the exhaust throttle valve 7 is closed.

Therefore, it is possible to increase the proportion of the amount of exhaust whose temperature has been retained by the double-layer pipe structure to the entire amount of exhaust introduced into the right-side main exhaust purification device 4 and the left-side main exhaust purification device 54 and, therefore, increase the temperature of the right-side main exhaust purification device 4 and the left-side main exhaust purification device 54. As a result, the richness/leanness proportion in the rich/lean control can be made smaller, so that the combustion in the internal combustion engine can be made more stable.

Incidentally, as for the operation state where the exhaust mixture-good flag can be turned on, it is permissible that an appropriate range of operation state may be determined empirically and arranged into a map beforehand and that it may be determined whether the operation state of the internal combustion engine is within the range on the map.

Subsequently, if at a time point t5, the exhaust mixture-good flag is turned off, that is, it is judged that the operation state of the internal combustion engine has become a state where, with the exhaust throttle valve 7 closed, the exhaust having passed through the right-side mixture pipe 3 is no longer sufficiently homogenized, then the exhaust throttle valve 7 is opened. As a result, the mixing of exhaust in the junction mixture pipe 5 is promoted, so that the degree of homogeneity of the exhaust introduced into the right-side main exhaust purification device 4 and the left-side main exhaust purification device 54 can be improved.

In that case, the proportion of the amount of exhaust having passed through the temperature-retaining double-pipe structure to the entire amount of exhaust introduced into the right-side main exhaust purification device 4 and the left-side main exhaust purification device 54 decreases. Therefore, drop in the temperature of right-side main exhaust purification device 4 and the left-side main exhaust purification device 54 may occur. In this embodiment, therefore, in response to this case, the richness/leanness proportion is made larger so that the temperature of the right-side main exhaust purification device 4 and the left-side main exhaust purification device 54 can be kept at a high temperature that is needed for SOx poisoning recovery.

Then, if at a time point t6 the request for SOx poisoning recovery is removed, the rich/lean control is stopped, and the operation is switched to an operation based on an ordinary lean air-fuel ratio.

As described above, in this embodiment, for the SOx poisoning recovery process, first the rich/lean control is performed and the exhaust throttle valve 7 is opened. Therefore, the exhaust through the right-side mixture pipe 3 and the exhaust through the left-side mixture pipe 53 are mixed in the junction mixture pipe 5, so that the degree of homogeneity of the exhaust introduced into the right-side main exhaust purification device 4 and the left-side main exhaust purification device 54 can be improved.

If while a request for the SOx poisoning recovery process is present, the operation state of the internal combustion engine is an operation state where the degree of homogeneity of the exhaust through the right-side mixture pipe 3 is considered sufficiently high, the exhaust throttle valve 7 is closed. Therefore, in that case, the temperature of the exhaust introduced into the right-side main exhaust purification device 4 and the left-side main exhaust purification device 54 can be raised. Thus, if there is no need for a large richness/leanness proportion in the rich/lean control, the richness/leanness proportion can be made smaller, so that the combustion in the internal combustion engine can be stabilized.

Furthermore, in the embodiment, if while a request for SOx poisoning recovery is present, the operation state of the internal combustion engine deviates from the operation state that is suitable for the rich/lean control, the rich/lean control is interrupted and the exhaust throttle valve 7 is closed. This substantially prevents the state of combustion in the internal combustion engine from becoming unstable and substantially prevents occurrence of knocking during the rich/lean control. At the same time, the temperature drop of the right-side main exhaust purification device 4 and the left-side main exhaust purification device 54 can be substantially prevented. Furthermore, at that time, the air-fuel ratios of the exhausts from the right-side bank and the left-side bank are brought to the stoichiometric ratio, so that deterioration of emissions during the period can be substantially prevented.

In the foregoing embodiment, the exhaust throttle valve 7 is opened or closed depending on the operation state of the internal combustion engine. The opening and closing actions of the exhaust throttle valve 7 do not necessarily mean only the fully opening action and the fully closing action. That is, the degree of opening of the exhaust throttle valve 7 may be changed continuously in accordance with the operation state of the internal combustion engine. Furthermore, in that case, the richness/leanness proportion may also be changed continuously in accordance with the degree of opening of the exhaust throttle valve 7.

An exhaust purification system in accordance with a sixth embodiment of the invention will be described. In this embodiment, the temperature control of the right-side main exhaust purification device 4 and the left-side main exhaust purification device 54 is actively performed. Incidentally, the construction of the exhaust purification system of this embodiment is substantially the same as that described above in conjunction with the fourth embodiment.

FIG. 9 is a time chart illustrating changes in various control factors in a SOx poisoning recovery process in this embodiment. It is assumed that a request for SOx poisoning recovery is output at a time point t7 in FIG. 9. In this embodiment, at that time point, the rich/lean control is not instantly begun, but the exhaust throttle valve 7 is closed first. Therefore, the proportion of the amount of exhaust whose temperature has been retained by the double-layer pipe structure to the entire amount of exhaust introduced into the right-side main exhaust purification device 4 and the left-side main exhaust purification device 54 can be increased, and therefore, the temperature of the right-side main exhaust purification device 4 and the left-side main exhaust purification device 54 can be raised.

Then, the rich/lean control is begun at a time point t8 when the temperature of the right-side main exhaust purification device 4 and the left-side main exhaust purification device 54 rises to a rich/lean control beginning temperature T0. The richness/leanness proportion on this occasion can be made smaller in comparison with the case where the preheating of the right-side main exhaust purification device 4 and the left-side main exhaust purification device 54 by closing the exhaust throttle valve 7 is not performed during the period of the time point t7 to the time point t8. As a result, the combustion in the internal combustion engine during the rich/lean control can be stabilized, and occurrence of knocking can be substantially prevented.

In other words, the aforementioned rich/lean control beginning temperature T0 is a temperature of the right-side main exhaust purification device 4 and the left-side main exhaust purification device 54 which can be reached only by closing the exhaust throttle valve 7. By obtaining the temperature T0 of the right-side main exhaust purification device 4 and the left-side main exhaust purification device 54 prior to the rich/lean control, the richness/leanness proportion is made smaller so that the combustion in the internal combustion engine during rich/lean control can be sufficiently stabilized and occurrence of knocking can be substantially prevented. The temperature T0 may be empirically determined beforehand.

The air-fuel ratios of the exhausts from the right-side bank and the left-side bank during the period of the time point t7 to the time point t8 are set at the stoichiometric ratio. Therefore, if during this period, the temperature of the right-side main exhaust purification device 4 and the left-side main exhaust purification device 54 rises to such a temperature that the removal of NOx is difficult for lean air-fuel ratio exhaust, NOx is actually able to be removed by the three-way catalytic function of the devices. As a result, the deterioration of emissions during this period can be substantially prevented. Incidentally, the period of the time point t7 to the time point t8 corresponds to a first predetermined period.

In this embodiment, the period of the time point t8 to a time point t9, the rich/lean control is continued to carry out the SOx poisoning recovery of the right-side main exhaust purification device 4 and the left-side main exhaust purification device 54. Incidentally, the temperature of the right-side main exhaust purification device 4 and the left-side main exhaust purification device 54 that should be maintained during this period is a temperature that allows SOx to be reduced and released at high efficiency. This temperature corresponds to a predetermined temperature.

It is assumed that the request for SOx poisoning recovery is removed at the time point t9. At that time, the exhaust throttle valve 7 is opened. As a result, the proportion of the amount of exhaust whose temperature has been retained by the double-layer pipe structure to the entire amount of exhaust introduced into the right-side main exhaust purification device 4 and the left-side main exhaust purification device 54 is lowered. This promptly lowers the temperature of the right-side main exhaust purification device 4 and the left-side main exhaust purification device 54. As a result, the temperature of the right-side main exhaust purification device 4 and the left-side main exhaust purification device 54 soon drops to a temperature that allows the removal of NOx from a lean air-fuel ratio exhaust.

During period of the time point t9 to the time point t10 at which the temperature of the right-side main exhaust purification device 4 and the left-side main exhaust purification device 54 reaches the temperature that allows the removal of NOx from a lean air-fuel ratio exhaust, the air-fuel ratios of the exhausts from the right-side bank and the left-side bank are controlled at the stoichiometric ratio. Therefore, during the period until the temperature of the right-side main exhaust purification device 4 and the left-side main exhaust purification device 54 becomes sufficiently low, deterioration of emissions can be substantially prevented. Incidentally, the period of the time point t9 to the time point t10 corresponds to a second predetermined period.

An exhaust purification system in accordance with a seventh embodiment of the invention will be described. In the exhaust purification system of this embodiment, the mixibility of the exhausts from the right-side bank and the left-side bank is made even higher, and the vehicle installability of the system is further heightened, in comparison with the system described above in conjunction with the fifth embodiment.

Figure 10A:
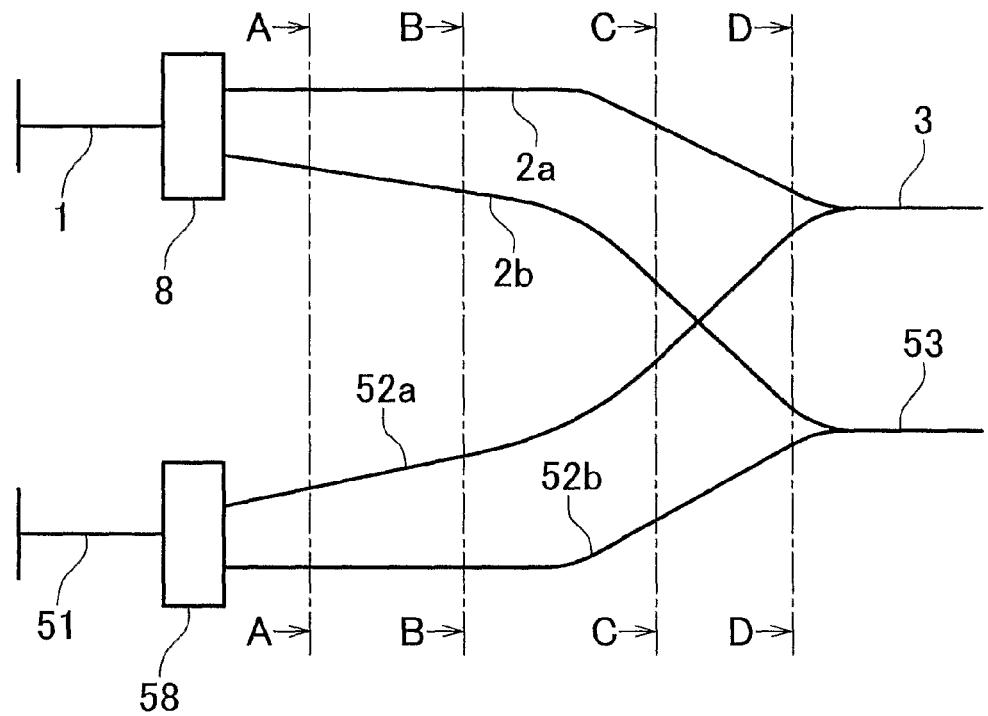
FIGS. 10A and 10B are schematic diagrams illustrating an overall construction of an exhaust purification system in a seventh embodiment of the invention.
Figure 10B:
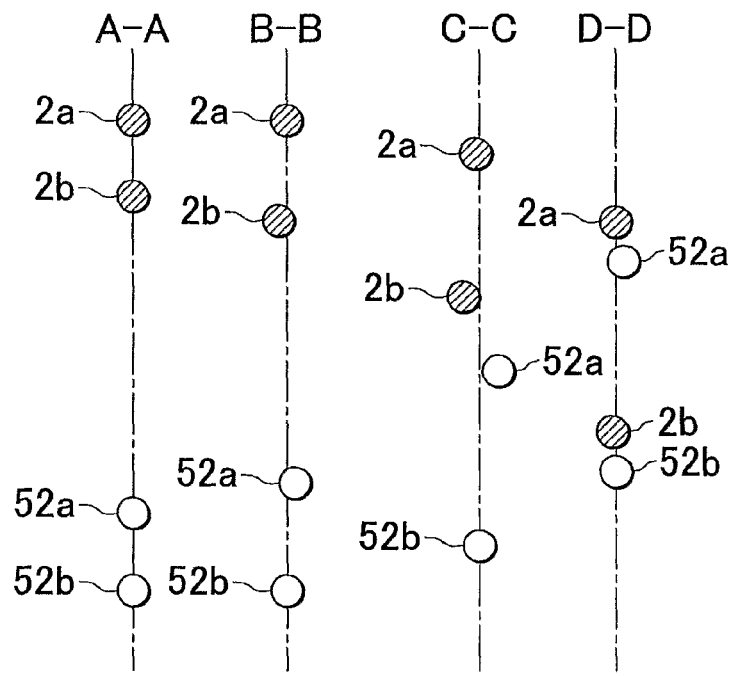

FIGS. 10A and 10B are schematic diagrams illustrating the exhaust purification system of this embodiment. In the drawings, the portions or constructions denoted by the same characters as those used in FIG. 7 are substantially the same as those described with reference to FIG. 7. As shown in FIG. 10A, in this embodiment, mixture promoting spaces 8, 58 are provided at branching points where a right-side exhaust pipe 1 and a left-side exhaust pipe 51 branch into right-side branch pipes 2*a*, 2*b* and left-side branch pipes 52*a*, 52*b*, respectively. The lengths of the right-side branch pipes 2*a*, 2*b* and the left-side branch pipes 52*a*, 52*b* are all set substantially equal. Furthermore, as the right-side branch pipe 2*b* and the left-side branch pipe 52*a* cross each other, the two pies are gradually deformed as indicated in FIG. 10B so that the right-side branch pipe 2*b* is twisted in a direction away from the viewer of the drawing and the left-side branch pipe 52*a* is twisted in a direction toward the viewer of the drawing.

As described above, in this embodiment, the mixture promoting spaces 8, 58 are provided at the branching points where the right-side exhaust pipe 1 and the left-side exhaust pipe 51 branch into the right-side branch pipes 2*a*, 2*b* and the left-side branch pipes 52*a*, 52*b*, respectively. Therefore, regardless of the configurations of the right-side exhaust pipe 1 and the left-side exhaust pipe 51, it is possible to substantially prevent the amounts of flow of exhaust into the right-side branch pipes 2*a*, 2*b* and the amounts of flow of exhaust into the left-side branch pipes 52*a*, 52*b* from becoming different from each other due to offset streams of exhaust. As a result, the mixing in the right-side mixture pipe 3 and the left-side mixture pipe 53 is promoted, so that the degree of homogeneity can be improved.

Furthermore, in this embodiment, as the lengths of the right-side branch pipes 2*a*, 2*b* and the left-side branch pipes 52*a*, 52*b* are all set substantially equal, the states of pipe resonance and the pressure losses of the pipes can be made substantially equal, and therefore the flows of exhaust therethrough can be made equal. As a result, the mixture in the right-side mixture pipe 3 and the left-side mixture pipe 53 can be further promoted, and the degree of homogeneity can be further improved.

Furthermore, in this embodiment, as the right-side branch pipe 2*b* and the left-side branch pipe 52*b* cross each other, the pipes are gradually deformed so that the right-side branch pipe 2*b* is twisted in a direction away from the viewer of the drawing and the left-side branch pipe 52*a* is twisted in a direction toward the viewer of the drawing. Therefore, the space that is needed at the time of installation of the exhaust purification system in a vehicle can be reduced.

In conjunction with the foregoing embodiments, a 2-4-2 type exhaust system has been described in which the exhaust pipes from the two groups of cylinders of the internal combustion engine are each divided into two branch pipes, that is, a total of four branch pipes are formed, and branch pipes are joined to form two mixture pipes. Furthermore, a 2-4-2-1-2 type exhaust system has also been described in which the two mixture pipes are joined and the junction portion is then divided into two second mixture pipes.

However, the types of exhaust system to which the invention is applicable are not limited to the above-described types. The invention is also applicable to, for example, exhaust systems of a 2-6-3 type, a 2-6-3-1 type, a 2-6-3-1-3 type, etc.

Although the embodiment have been described in conjunction with the cases where the internal combustion engine has two banks and the air-fuel ratios and the amounts of the exhausts discharged from the two banks are controlled, the term cylinder group in the invention does not exclusively mean a bank. For example, the invention may also be applied to the case where a cylinder block row is divided into a plurality of cylinder groups and the air-fuel ratio and the state of operation are controlled for each cylinder group.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An exhaust purification system for an internal combustion engine, comprising:
 an exhaust passageway through which exhausts discharged from a plurality of cylinder groups of the internal combustion engine pass, and which includes:
  cylinder group-directly coupled exhaust passageways which are connected respectively to the plurality of cylinder groups, and through which the exhausts discharged from the cylinder groups pass, and a number of which is equal to a number of the cylinder groups,
  cylinder group-respective branch passageways which are formed by division of each cylinder group-directly coupled exhaust passageway, numbers of the cylinder group-respective branch passageways of the individual cylinder group-directly coupled exhaust passageways being equal,
  mixture exhaust passageways each of which is formed by joining one of the cylinder group-respective branch passageways dividing from each one of the cylinder group-directly coupled exhaust passageways, with respect to all the cylinder group-directly coupled exhaust passageways, a number of the mixture exhaust passageways being equal to a number of cylinder group-respective branch passageways formed for a cylinder group,
  a junction mixture exhaust passageway formed by junction of all the mixture exhaust passageways, and
  an exhaust amount control portion which is provided for at least one of the mixture exhaust passageways and which controls an amount of exhaust that passes through the at least one of the mixture exhaust passageways; and
 one or more exhaust purification devices provided in the exhaust passageway and into which an exhaust that passes through the junction mixture exhaust passageway is introduced;
 wherein the exhaust amount control portion reduces the amount of exhaust that passes through at least one of the mixture exhaust passageways over a predetermined period after beginning of a cold start of the internal combustion engine.

2. The exhaust purification system for the internal combustion engine according to claim 1, wherein an integrated amount of intake air or an integrated amount of fuel injection following the beginning of the cold start of the internal combustion engine is estimated, and the predetermined period is set as a period lasting until an estimated value of the integrated amount of intake air or the integrated amount of fuel injection exceeds a predetermined value, and the exhaust amount control portion increases the amount of exhaust that passes through the at least one of the mixture exhaust passageways after elapse of the predetermined period from the beginning of the cold start of the internal combustion engine.

3. The exhaust purification system for the internal combustion engine according to claim 1, wherein the exhaust amount control portion is an exhaust throttle valve provided in at least one of the mixture exhaust passageways, and the amount of exhaust that passes through the at least one of the mixture exhaust passageways is increased or decreased by opening or closing the exhaust throttle valve, and wherein an air-fuel ratio sensor capable of detecting the air-fuel ratio of exhaust when activated by heating is provided at an upstream side and/or a downstream side of the one or more exhaust purification devices, and wherein heating of the air-fuel ratio sensor is stopped when the exhaust throttle valve is opened during the predetermined period.

4. The exhaust purification system for the internal combustion engine according to claim 3, wherein when the exhaust throttle valve is opened during the predetermined period, the exhaust throttle valve is actually opened after elapse of a predetermined delay time following stopping of the heating.

5. The exhaust purification system for the internal combustion engine according to claim 3, wherein during at least a portion of the predetermined period, an operation of opening the exhaust throttle valve and stopping the heating, and an operation of closing the exhaust throttle valve and beginning the heating are alternated.

6. The exhaust purification system for the internal combustion engine according to claim 3,
 wherein air-fuel ratio sensors are provided at an upstream side and a downstream side of the one or more exhaust purification devices, and
 wherein if heating of the air-fuel ratio sensor provided at the upstream side of the one or more exhaust purification devices is stopped, an air-fuel ratio control of the internal combustion engine is performed by using an output of the air-fuel ratio sensor provided at the downstream side of the one or more exhaust purification devices.

7. The exhaust purification system for the internal combustion engine according to claim 6, wherein if a temperature of the mixture exhaust passageway provided with the exhaust throttle valve becomes equal to or higher than a dew point during a stop of the heating of the air-fuel ratio sensor provided at the upstream side of the one or more exhaust purification devices, the heating of the air-fuel ratio sensor provided at the upstream side of the one or more exhaust purification devices is begun and the air-fuel ratio control of the internal combustion engine is performed by using an output of the air-fuel ratio sensor provided at the upstream side of the one or more exhaust purification devices.

8. The exhaust purification system for the internal combustion engine according to claim 1,
 wherein the exhaust amount control portion is an exhaust throttle valve provided in at least one of the mixture exhaust passageways, and the amount of exhaust that passes through the at least one of the mixture exhaust passageways is increased or decreased by opening or closing the exhaust throttle valve,
 wherein an air-fuel ratio sensor capable of detecting the air-fuel ratio of exhaust when activated by heating is provided at an upstream side and/or a downstream side of the one or more exhaust purification devices,
 wherein immediately after the cold start of the internal combustion engine begins during the predetermined period, the exhaust throttle valve is opened and heating of the air-fuel ratio sensor is stopped, and
 wherein if a temperature of the mixture exhaust passageway provided with the exhaust throttle valve becomes equal to or higher than a dew point during the predetermined period, the heating of the air-fuel ratio sensor provided at the upstream side of the one or more exhaust purification devices is performed and the exhaust throttle valve is closed.

9. The exhaust purification system for the internal combustion engine according to claim 1,
 wherein the exhaust passageway includes a temperature retention portion provided for one or more cylinder group-respective branch passageways among the plurality of cylinder group-respective branch passageways provided for each cylinder group-directly coupled exhaust passageway, and which substantially prevents heat release to outside from the exhaust that passes through the one or more cylinder group-respective branch passageways, and wherein a portion of the mixture exhaust passageways is a temperature retention portion-equipped mixture exhaust passageway formed by joining a cylinder group-respective branch passageway provided with the temperature retention portion among the plurality of cylinder group-respective branch passageways dividing from each one of the cylinder group-directly coupled exhaust passageways, with respect to all the cylinder group-directly coupled exhaust passageways.

10. The exhaust purification system for the internal combustion engine according to claim 9, wherein the temperature retention portion is provided by providing at least a portion of the cylinder group-respective branch passageways with a double-layer pipe structure.

11. The exhaust purification system for the internal combustion engine according to claim 9, wherein the exhaust amount control portion is an exhaust throttle valve provided in at least one of the mixture exhaust passageways.

12. The exhaust purification system for the internal combustion engine according to claim 11,
wherein the one or more exhaust purification devices include a storage reduction type NOx catalyst, and
wherein if a SOx poisoning recovery with respect to the storage reduction type NOx catalyst is requested, a rich/lean control in which the air-fuel ratio of the exhaust from one or more cylinder groups among the plurality of cylinder groups is brought to a predetermined rich air-fuel ratio and in which the air-fuel ratio of the exhaust from the other one or more cylinder groups among the plurality of cylinder groups is brought to a predetermined lean air-fuel ratio is performed, and the exhaust throttle valve is opened.

13. The exhaust purification system for the internal combustion engine according to claim 12, wherein even during a period when the SOx poisoning recovery process is requested, the exhaust throttle valve is closed if an operation state of the internal combustion engine belongs to a predetermined good mixture operation state where a mixture state of the exhaust in the temperature retention portion-equipped mixture exhaust passageway becomes good.

14. The exhaust purification system for the internal combustion engine according to claim 12, wherein the rich/lean control is interrupted and the exhaust throttle valve is closed if the operation state of the internal combustion engine deviates from an operation state suitable for the rich/lean control during the period when the SOx poisoning recovery process is requested.

15. The exhaust purification system for the internal combustion engine according to claim 12, wherein a richness/leanness proportion in the rich/lean control is changed in accordance with opening/closure of the exhaust throttle valve.

16. The exhaust purification system for the internal combustion engine according to claim 14, wherein, in conjunction with closure of the exhaust throttle valve, the air-fuel ratios of the exhausts from the plurality of cylinder groups are brought to a stoichiometric air-fuel ratio.

17. The exhaust purification system for the internal combustion engine according to claim 9,
wherein the one or more exhaust purification devices include a storage reduction type NOx catalyst, and
wherein if a SOx poisoning recovery with respect to the storage reduction type NOx catalyst is requested:
over a first predetermined period, the air-fuel ratios of the exhausts from the plurality of cylinder groups are brought to a stoichiometric air-fuel ratio and a temperature of the exhaust that passes through the junction mixture exhaust passageway is raised by the exhaust amount control portion;
after the predetermined period elapses, a rich/lean control in which the air-fuel ratio of the exhaust from one or more cylinder groups among the plurality of cylinder groups is brought to a predetermined rich air-fuel ratio and in which the air-fuel ratio of the exhaust from the other one or more cylinder groups among the plurality of cylinder groups is brought to a predetermined lean air-fuel ratio is performed, and a temperature of the exhaust that passes through the junction mixture exhaust passageway is brought to a predetermined temperature that allows the SOx poisoning recovery of the one or more exhaust purification devices by the exhaust amount control portion; and
over a second predetermined period following removal of a request for the SOx poisoning recovery, the air-fuel ratios of the exhausts from the plurality of cylinder groups are brought to the stoichiometric air-fuel ratio, and the temperature of the exhaust that passes through the junction mixture exhaust passageway is lowered by the exhaust amount control portion.

* * * * *